US011523087B2

(12) United States Patent
Taylor et al.

(10) Patent No.: US 11,523,087 B2
(45) Date of Patent: Dec. 6, 2022

(54) METHODS AND SYSTEMS FOR UTILIZING MULTI-PANE VIDEO COMMUNICATIONS IN CONNECTION WITH NOTARIZING DIGITAL DOCUMENTS

(71) Applicant: POPio IP Holdings, LLC, Sandy, UT (US)

(72) Inventors: Jed W. Taylor, South Jordan, UT (US); Timothy Eugene Pranger, Eagle Mountain, UT (US); Kurt Forsberg, Highland, UT (US); Ryanne Mayers, Sandy, UT (US); Robert Eric Roy, Riverton, UT (US); Austin Barnes, Riverton, UT (US)

(73) Assignee: POPio Mobile Video Cloud, LLC, Sandy, UT (US)

( * ) Notice: Subject to any disclaimer, the term of this patent is extended or adjusted under 35 U.S.C. 154(b) by 0 days.

(21) Appl. No.: 17/314,401

(22) Filed: May 7, 2021

(65) Prior Publication Data
US 2021/0266500 A1 Aug. 26, 2021

Related U.S. Application Data

(63) Continuation-in-part of application No. 17/036,955, filed on Sep. 29, 2020, now Pat. No. 11,218,665, (Continued)

(51) Int. Cl.
*H04N 7/14* (2006.01)
*H04N 5/232* (2006.01)
(Continued)

(52) U.S. Cl.
CPC ......... *H04N 7/147* (2013.01); *G06F 3/04842* (2013.01); *G06F 3/1446* (2013.01);
(Continued)

(58) Field of Classification Search
CPC . G06F 3/04842; G06F 3/1446; G06Q 20/042; G06Q 20/3223; G06Q 40/02;
(Continued)

(56) References Cited

U.S. PATENT DOCUMENTS

D619,593 S 7/2010 Fujioka et al.
7,812,988 B2 10/2010 Doo
(Continued)

FOREIGN PATENT DOCUMENTS

EP 2833595 A1 2/2015
WO WO 2017/180226 10/2017

OTHER PUBLICATIONS

International Search Report & Written Opinion as received in PCTUS2017-016584 dated Apr. 25, 2017.
(Continued)

*Primary Examiner* — Maria El-Zoobi
(74) *Attorney, Agent, or Firm* — Keller Preece PLLC

(57) ABSTRACT

Systems and methods are disclosed for establishing a video connection between a client device and a notary support terminal while enabling the client device and notary support terminal to notarize a digital document. In particular, the client device can display multiple panes simultaneously, the multiple panes including a first pane that displays the video chat and a second pane that displays at least one notarization interface for notarizing the digital document. While the client device displays the multiple panes and during the video chat, the disclosed systems can notarize the digital document by authenticating the user of the client device, collecting signatures from the user of the client device and the notary associated with the notary support terminal, and applying an electronic notary seal to the digital document.

20 Claims, 19 Drawing Sheets

Related U.S. Application Data which is a continuation of application No. 16/592,587, filed on Oct. 3, 2019, now Pat. No. 10,827,149, which is a continuation-in-part of application No. 16/115,037, filed on Aug. 28, 2018, now Pat. No. 10,771,738, which is a continuation of application No. 15/498,290, filed on Apr. 26, 2017, now Pat. No. 10,091,459, which is a continuation of application No. 15/208,576, filed on Jul. 12, 2016, now Pat. No. 9,699,406, which is a continuation-in-part of application No. 29/561,280, filed on Apr. 14, 2016, now Pat. No. Des. 845,972.

(51) Int. Cl.
| | | |
|---|---|---|
| *H04N 7/08* | (2006.01) | |
| *H04L 65/1069* | (2022.01) | |
| *H04N 5/265* | (2006.01) | |
| *G06F 3/04842* | (2022.01) | |
| *G06Q 40/02* | (2012.01) | |
| *G06Q 20/04* | (2012.01) | |
| *G06Q 20/32* | (2012.01) | |
| *G06F 3/14* | (2006.01) | |

(52) U.S. Cl.
CPC ....... *G06Q 20/042* (2013.01); *G06Q 20/3223* (2013.01); *G06Q 40/02* (2013.01); *H04L 65/1069* (2013.01); *H04N 5/23293* (2013.01); *H04N 5/265* (2013.01); *H04N 7/08* (2013.01)

(58) Field of Classification Search
CPC ..................... H04L 65/1069; H04N 5/23293; H04N 5/265; H04N 7/08; H04N 7/141; H04N 7/147
USPC ...................................................... 348/14.02
See application file for complete search history.

(56) References Cited

U.S. PATENT DOCUMENTS

| | | |
|---|---|---|
| 8,117,562 B2 | 2/2012 | Getsch |
| D670,716 S | 11/2012 | Majeed et al. |
| 8,433,650 B1 | 4/2013 | Thomas |
| D700,912 S | 3/2014 | Kim |
| 8,782,043 B2 | 7/2014 | Chisholm et al. |
| 8,789,094 B1 | 7/2014 | Singh et al. |
| 8,890,685 B1 | 11/2014 | Sookman et al. |
| 8,924,465 B1 | 12/2014 | Tunguz-Zawislak |
| 8,955,743 B1 | 2/2015 | Block et al. |
| D725,133 S | 3/2015 | Smirin et al. |
| D725,665 S | 3/2015 | Tseng et al. |
| D726,736 S | 4/2015 | Smirin et al. |
| D739,867 S | 9/2015 | Faria et al. |
| D747,733 S | 1/2016 | Scalisi |
| 9,245,100 B2 | 1/2016 | Marco et al. |
| D755,812 S | 5/2016 | Lim |
| D759,662 S | 6/2016 | Panjabi |
| D760,259 S | 6/2016 | Watson |
| D762,231 S | 7/2016 | Pearson |
| D762,676 S | 8/2016 | Lim |
| D762,686 S | 8/2016 | Lee et al. |
| D763,872 S | 8/2016 | Tussy |
| D765,683 S | 9/2016 | Peng |
| D767,601 S | 9/2016 | Zhou |
| D768,148 S | 10/2016 | Jung et al. |
| D769,921 S | 10/2016 | Smith |
| D770,487 S | 11/2016 | Li |
| D770,488 S | 11/2016 | Li |
| D774,061 S | 12/2016 | Wu |
| D776,147 S | 1/2017 | Simmons et al. |
| D777,733 S | 1/2017 | Loosli et al. |
| D779,540 S | 2/2017 | Rad et al. |
| D780,787 S | 3/2017 | Gomez |
| D781,311 S | 3/2017 | Rad et al. |
| D781,874 S | 3/2017 | Dunn |
| D789,389 S | 6/2017 | Kim et al. |
| D789,395 S | 6/2017 | Weeresinghe |
| D789,956 S | 6/2017 | Ortega et al. |
| D790,578 S | 6/2017 | Hatzikostas |
| 9,699,406 B1 | 7/2017 | Pranger et al. |
| D793,427 S | 8/2017 | Sun |
| D797,118 S | 9/2017 | Van Every et al. |
| D803,851 S | 11/2017 | Vazquez |
| 9,820,085 B1 | 11/2017 | Telang et al. |
| 10,091,459 B2 | 10/2018 | Pranger et al. |
| 10,218,938 B2 | 2/2019 | Taylor et al. |
| 10,218,939 B2 | 2/2019 | Taylor et al. |
| D845,972 S | 4/2019 | Pranger et al. |
| 10,402,790 B1 | 9/2019 | Clark et al. |
| 10,756,906 B2 * | 8/2020 | Toth .................. H04L 9/0894 |
| 2005/0149630 A1 | 7/2005 | Smolinski et al. |
| 2006/0114315 A1 | 6/2006 | Crook |
| 2006/0152594 A1 | 7/2006 | Landschaft et al. |
| 2007/0067267 A1 | 3/2007 | Ives |
| 2007/0093241 A1 | 4/2007 | Oh et al. |
| 2008/0075067 A1 | 3/2008 | Guglielmi et al. |
| 2009/0313167 A1 | 12/2009 | Dujari et al. |
| 2010/0053302 A1 | 3/2010 | Ivashin et al. |
| 2010/0073454 A1 | 3/2010 | Lovhaugen et al. |
| 2011/0106671 A1 | 5/2011 | Minnis et al. |
| 2011/0249073 A1 | 10/2011 | Cranfill et al. |
| 2012/0017149 A1 | 1/2012 | Lai et al. |
| 2012/0030741 A1 | 2/2012 | Chai et al. |
| 2012/0036081 A1 * | 2/2012 | Hatter .................. H04L 9/3247 705/321 |
| 2012/0079419 A1 | 3/2012 | Ajitomi et al. |
| 2012/0251985 A1 | 10/2012 | Steels et al. |
| 2012/0296747 A1 | 11/2012 | Triola |
| 2013/0013499 A1 | 1/2013 | Kalgi |
| 2013/0083066 A1 | 4/2013 | Aoki et al. |
| 2013/0203345 A1 | 8/2013 | Fisher |
| 2013/0297353 A1 | 11/2013 | Strange et al. |
| 2014/0022328 A1 | 1/2014 | Gechter et al. |
| 2014/0051402 A1 | 2/2014 | Qureshi |
| 2014/0063174 A1 | 3/2014 | Junuzovic et al. |
| 2014/0106721 A1 * | 4/2014 | Calman .............. H04L 12/1818 455/416 |
| 2014/0214967 A1 | 7/2014 | Baba et al. |
| 2015/0026351 A1 | 1/2015 | Calman et al. |
| 2015/0149536 A1 | 5/2015 | Nishikawa et al. |
| 2015/0149565 A1 | 5/2015 | Ahmed |
| 2015/0227298 A1 | 8/2015 | Kim et al. |
| 2015/0234636 A1 | 8/2015 | Barnes |
| 2015/0256695 A1 | 9/2015 | Showering et al. |
| 2015/0304196 A1 | 10/2015 | Sun et al. |
| 2015/0326729 A1 | 11/2015 | Paolini-Subramanya |
| 2015/0334344 A1 | 11/2015 | Shoemake |
| 2015/0350446 A1 | 12/2015 | Glass et al. |
| 2016/0006817 A1 | 1/2016 | Mitic et al. |
| 2016/0048841 A1 * | 2/2016 | Johnson .................. G06Q 30/01 705/304 |
| 2016/0100298 A1 | 4/2016 | Peterson |
| 2016/0104122 A1 | 4/2016 | Mande et al. |
| 2016/0132847 A1 | 5/2016 | Sarris |
| 2016/0192308 A1 | 6/2016 | Turney et al. |
| 2016/0204122 A1 | 7/2016 | Shoji et al. |
| 2016/0212255 A1 | 7/2016 | Lee et al. |
| 2016/0224210 A1 | 8/2016 | Moore et al. |
| 2016/0300030 A1 | 10/2016 | Vann et al. |
| 2016/0337424 A1 | 11/2016 | Mandyam |
| 2016/0378744 A1 | 12/2016 | XiangLi et al. |
| 2017/0017635 A1 | 1/2017 | Leliwa et al. |
| 2017/0140504 A1 | 5/2017 | Jeong et al. |
| 2017/0150223 A9 | 5/2017 | Zaccone et al. |
| 2017/0171700 A1 | 6/2017 | Sabarez et al. |
| 2017/0245759 A1 * | 8/2017 | Jain ..................... G16H 50/30 |
| 2017/0270079 A1 | 9/2017 | Rajwat et al. |
| 2017/0313262 A1 | 11/2017 | Wisnia et al. |
| 2017/0366353 A1 | 12/2017 | Struttmann |
| 2017/0368413 A1 | 12/2017 | Shavit |
| 2018/0012432 A1 | 1/2018 | Shin et al. |
| 2018/0018396 A1 | 1/2018 | Roundtree et al. |
| 2018/0018838 A1 | 1/2018 | Fankhauser et al. |

(56) References Cited

U.S. PATENT DOCUMENTS

| | | |
|---|---|---|
| 2018/0035074 A1 | 2/2018 | Barnes |
| 2018/0054446 A1 | 2/2018 | Modras |
| 2018/0103341 A1 | 4/2018 | Moiyallah et al. |
| 2018/0104573 A1 | 4/2018 | Jeffery et al. |
| 2018/0176272 A1 | 6/2018 | Zur et al. |
| 2018/0367755 A1 | 12/2018 | Pranger et al. |
| 2019/0052840 A1 | 2/2019 | Taylor et al. |

OTHER PUBLICATIONS

U.S. Appl. No. 29/561,280, Jan. 24, 2018, Restriction Requirement.
U.S. Appl. No. 29/561,280, Aug. 14, 2018, Office Action.
U.S. Appl. No. 29/561,280, Feb. 6, 2019, Notice of Allowance.
U.S. Appl. No. 15/208,576, Nov. 30, 2016, Office Action.
U.S. Appl. No. 15/208,576, Feb. 16, 2017, Office Action.
U.S. Appl. No. 15/208,576, May 8, 2017, Office Action.
U.S. Appl. No. 15/208,576, May 24, 2017, Notice of Allowance.
U.S. Appl. No. 15/498,290, Oct. 19, 2017, Office Action.
U.S. Appl. No. 15/498,290, Mar. 21, 2018, Office Action.
U.S. Appl. No. 15/498,290, Jul. 18, 2018, Notice of Allowance.
U.S. Appl. No. 15/498,290, Aug. 24, 2018, Notice of Allowance.
U.S. Appl. No. 15/792,040, Apr. 26, 2018, Office Action.
U.S. Appl. No. 15/792,040, Sep. 11, 2018, Office Action.
U.S. Appl. No. 15/792,040, Nov. 9, 2018, Notice of Allowance.
U.S. Appl. No. 15/793,806, May 9, 2018, Office Action.
U.S. Appl. No. 15/793,806, Sep. 13, 2018, Office Action.
U.S. Appl. No. 15/793,806, Nov. 9, 2018, Notice of Allowance.
U.S. Appl. No. 16/160,379, May 24, 2019, Office Action.
U.S. Appl. No. 16/160,379, Oct. 3, 2019, Notice of Allowance.
U.S. Appl. No. 16/115,037, Apr. 30, 2019, Office Action.
U.S. Appl. No. 16/115,037, Sep. 9, 2019, Office Action.
U.S. Appl. No. 16/115,037, Jan. 21, 2020, Office Action.
U.S. Appl. No. 16/115,037, Jun. 10, 2020, Notice of Allowance.
U.S. Appl. No. 16/592,587, Apr. 21, 2020, Office Action.
U.S. Appl. No. 16/592,587, Aug. 12, 2020, Notice of Allowance.
U.S. Appl. No. 17/036,955, Aug. 9, 2021, Office Action.
U.S. Appl. No. 17/036,955, Nov. 15, 2021, Notice of Allowance.

\* cited by examiner

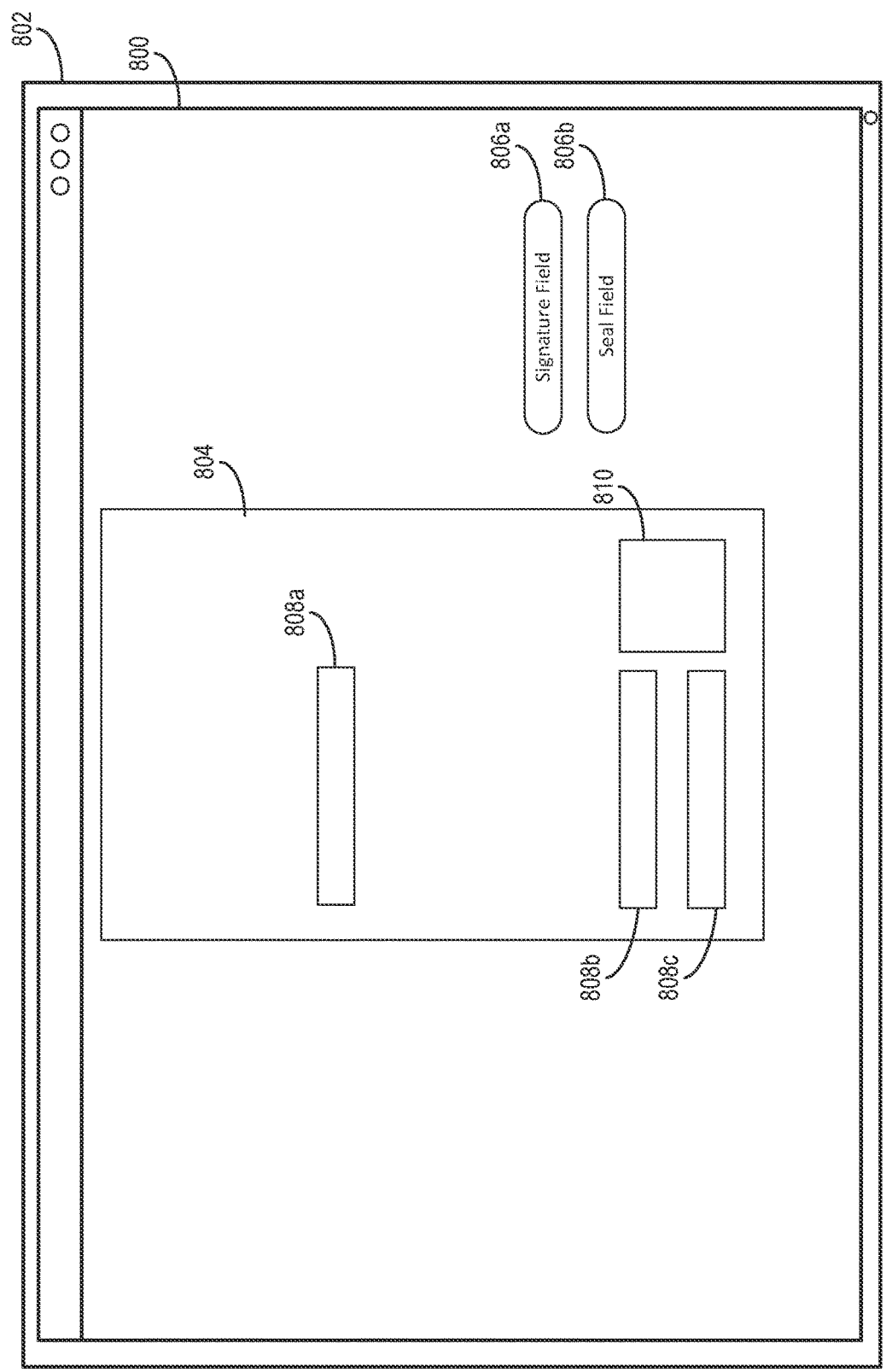

METHODS AND SYSTEMS FOR UTILIZING MULTI-PANE VIDEO COMMUNICATIONS IN CONNECTION WITH NOTARIZING DIGITAL DOCUMENTS

CROSS-REFERENCE TO RELATED APPLICATIONS

The present application is a continuation-in-part of U.S. patent application Ser. No. 17/036,955, filed on Sep. 29, 2020, which is a continuation of U.S. patent application Ser. No. 16/592,587, filed on Oct. 3, 2019, now U.S. Pat. No. 10,827,149, which is a continuation-in-part of U.S. patent application Ser. No. 16/115,037, filed on Aug. 28, 2018, now U.S. Pat. No. 10,771,738, which is a continuation of U.S. patent application Ser. No. 15/498,290, filed on Apr. 26, 2017, now U.S. Pat. No. 10,091,459, which is a continuation of U.S. patent application Ser. No. 15/208,576, filed on Jul. 12, 2016, now U.S. Pat. No. 9,699,406, which is a continuation-in-part of U.S. patent application Ser. No. 29/561,280, filed on Apr. 14, 2016, now U.S. Pat. No. D845,972. Each of the aforementioned applications are hereby incorporated by reference in their entirety.

BACKGROUND

Many modern businesses create software applications (e.g., mobile applications) meant to improve accessibility to the business and allow a user to perform some desired function or access information on a client device (e.g., a mobile device, laptop, etc.). Some businesses, such as game developers, operate their business solely through the software application itself. Other businesses, such as banks, may create a software application merely to provide customers a convenient alternative to visiting a brick-and-mortar branch of the business. This allows the user flexibility in determining when and where to interact with the business.

Despite these advantages, conventional software applications have several technological shortcomings that create inflexible and inefficient operation. For example, conventional software applications are typically inflexible, because they limit the actions that can be performed by a user. For example, a software application associated with a financial institution (e.g., a bank or credit union) may sufficiently enable a user to perform some tasks that are typically capable of being completed individually—such as opening an account or making a credit card payment. The same software application, however, may fail to adequately provide functionality for other tasks that typically require assistance or supervision.

Additionally, conventional software applications are inefficient. Indeed, many conventional software applications continually require the user to be the principal navigator and operator of the application. Though a user may seek assistance from a customer support representative in interacting with the application, the support representative is generally limited to orally providing instructions to the user (e.g., via a phone call). As a result, any rendered assistance fails to alleviate the burden of navigating and operating the application from the user. If the user does not understand how to navigate or operate the software application, even after receiving instruction, the resources of the software application (and the underlying device) may be needlessly tied up as the user tries to find the desired information or perform the desired actions.

Prior attempts to improve a user's experience have included tutorial slide shows or videos, help documents, guided tours of the site or application, or other similar attempts to familiarize the user with the offered functionality. These solutions, however, typically do not cover every function offered, overload the user with too much information at once, or offer a predetermined explanation with no elaboration if the user does not understand.

Other solutions, such as telephone support, require the user to either use multiple devices to follow the representative's instructions while on the phone or to write down or memorize the instructions and perform them after the conversation has ended. This limits a user to seeking support only where multiple devices or writing materials are available. For example, a user may be trying to use a mobile application on their mobile device. Many mobile devices do not allow a user to talk on a phone call and navigate a mobile application at the same time. Thus, a phone call many not be sufficient to resolve the user's concerns.

Users may attempt to perform a video call or text chat session to obtain help with a software application. Again, some devices do not allow for simultaneous video chats and navigation of a software application. Furthermore, even if the devices allow for both, the use of two separate applications (the software application and a video chat application) requires switching back and forth between the video call application and the software application, requires large amounts of processing power to run both applications, or otherwise leads to a degraded experience. In other words, prior solutions inadequately address the aforementioned flexibility and efficiency concerns.

SUMMARY

One or more embodiments described herein provide benefits and/or solve one or more of the foregoing or other problems in the art with systems, methods, and non-transitory computer-readable media that improve computer systems by implementing multi-pane engagement between a client device and a support terminal for notarizing a digital document during video communications. For example, in one or more embodiments, a system establishes a video connection between a client device and a support terminal and a separate connection for transmission of a workflow for notarizing a document. In some cases, the separate connection provides bidirectional capabilities that allows the support terminal to push workflow triggers, or corresponding workflow interfaces, directly to the client device while maintaining the video connection.

In one or more embodiments, in response to receiving a workflow trigger, the client device retrieves, renders, or otherwise obtains the corresponding workflow interface. In some embodiments, the support terminal pushes the corresponding workflow interface in conjunction with the workflow trigger. Thus, rather than requiring a user of a client application on a client device to navigate the client application to find the desired interfaces, the support terminal pushes triggers corresponding to those workflow interfaces directly to the client device. In effect, the systems, methods, and non-transitory computer-readable media allow a support terminal to remotely control the display of such workflow interfaces on the client device.

Additionally, in one or more embodiments, when the client device receives a notary workflow trigger (and/or the corresponding notary workflow interface itself), instructions stored on the client device execute, dividing the display of the client device into at least a first pane and a second pane (in alternative embodiments, the client device can receive a separate display trigger pushed by the support terminal). The first pane displays a video chat session and the second pane displays the corresponding notary workflow interface for notarizing a document. Thus, the user of the client device is able to maintain interpersonal communication with a user of the support terminal while reviewing and/or interacting with the notary workflow interface/client application. In this way, a user of the client application is spared the hassle of using multiple devices or memorizing instructions when seeking help in navigating and using the client application.

As suggested, in one or more embodiments, a workflow interface includes a notarization interface for notarizing a document. For example, a workflow interface can include a notarization interface for capturing/transmitting digital images of an identification card, answering security questions, or providing a signature to the document. As these notarization interfaces are displayed on the client device in conjunction with the video chat, the user of the support terminal (e.g., the notary) can verify the identity of the user and supervise the signing of the document. Further, the user of the support terminal can provide a notary signature and/or notary seal to complete the notarization process.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 8A-8C illustrate user interfaces used by the notary support system 106 for generating digital signatures and applying an electronic notary seal to a digital document in accordance with one or more embodiments;

DETAILED DESCRIPTION

Figure 1:
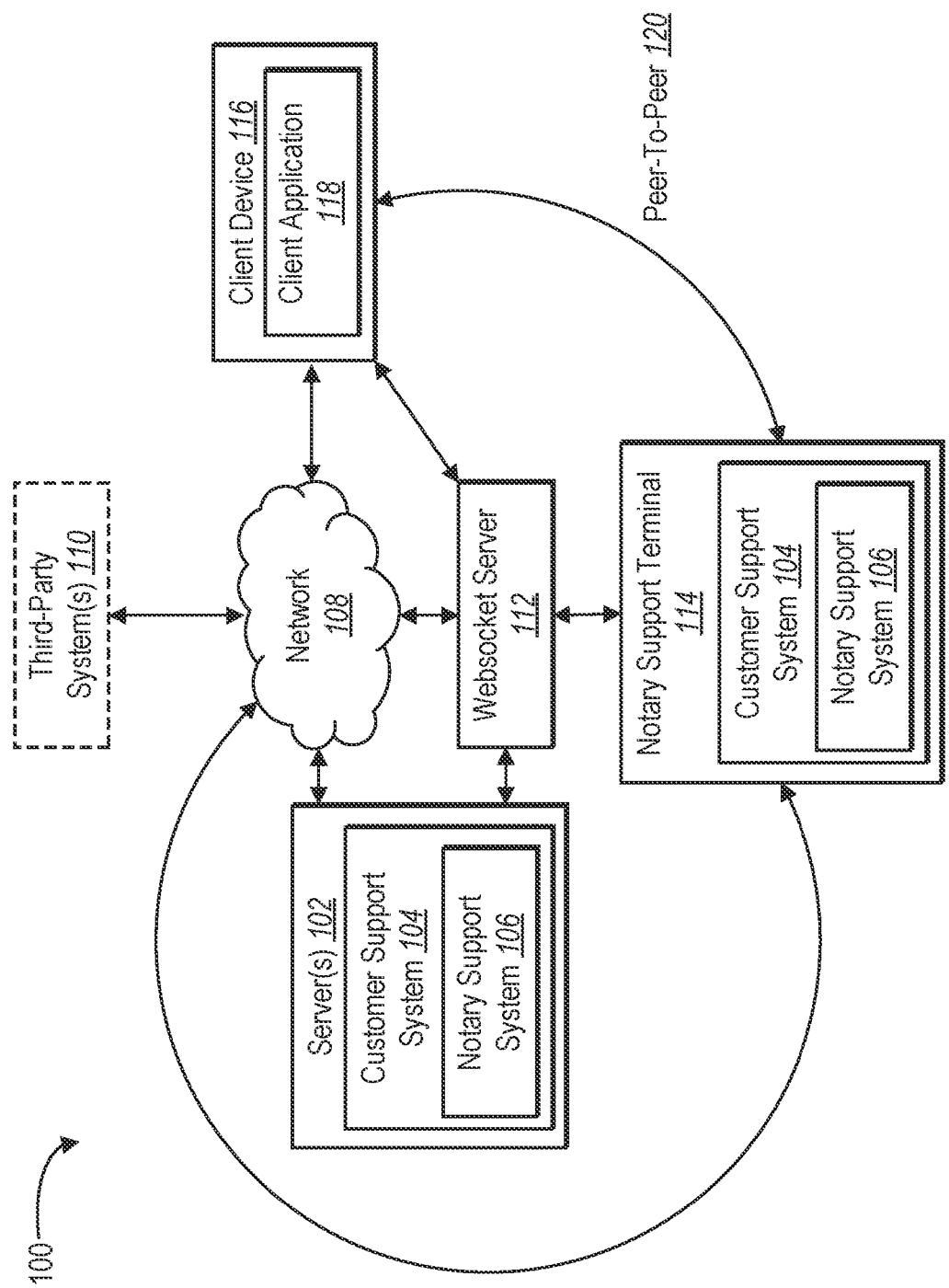
FIG. 1 illustrates an example environment in which a notary support system can operate in accordance with one or more embodiments.

One or more embodiments described herein include a notary support system that enables a single client application (e.g., a mobile application) to use multiple connections with a notary support terminal to provide a video chat on a client device (e.g., a mobile device) while concurrently providing interfaces for notarizing a digital document. To illustrate, a user of a client device can access the notary support system via the client application. In one or more embodiments, a user interface of the client application provides a selectable option to request assistance from a notary via video chat. In response to the user request or another trigger, the notary support system can establish a video chat session between the client device and the notary support terminal. The video chat allows the user to communicate with the notary associated the notary support terminal and seek assistance in notarizing a digital document. Indeed, the notary support system provides a remote notary solution so that a client device user and a notary in different locations can work together to remotely notarize a digital document.

During the video chat, the notary support system enables the notary to assist by allowing the notary support terminal to push a workflow trigger (referred to as a "notarization trigger") associated with a notary workflow to the client device. A notarization trigger corresponds to a particular notarization interface to be displayed on the client device or otherwise manipulated. The notarization interface can contain information to be viewed or a function to be performed at the client device as part of the notarization process. In one or more embodiments, the client device provides the notarization interface on the client device while concurrently providing the video chat via a multi-pane display of the single client application. In this way, the user may receive further assistance while reviewing or interacting with the notarization interface.

More particularly, in one or more embodiments, the notary support system initiates a video chat session by establishing a first connection between a client device and a notary support terminal. Once established, the notary support system conducts a video chat transmitted through the first connection and provides the video chat for display to both the notary support system and the client device. A user of the client device and a notary associated with the notary support terminal may then communicate with one another via the video chat.

Additionally, one or more embodiments of the notary support system enable the notary support terminal to push a notarization trigger associated with a notary workflow to the client device. For example, in at least one embodiment, the notary support terminal selects a notarization trigger from a set of selectable notarization triggers stored on the notary support terminal and subsequently pushes the notarization trigger to the client device. The notary support system may transmit the notarization trigger to the client device through a second connection. For example, the notary support system can use a second connection, separate from the first connection to send the notarization trigger. One will appreciate in light of the disclosure herein that the use of the separate connection allows the notary support terminal to push the notarization trigger, uses less computing resources, and avoids degrading the video chat. In one or more embodiments, the notary support terminal selects and transmits at least one notarization interface in conjunction with the corresponding notarization trigger. For example, by selecting and transmitting a notarization trigger, the notary support terminal can automatically select and transmit at least one corresponding notarization interface as well.

In response to the client device receiving the notarization trigger, the client application can divide a display of the client device into multiple panes (e.g., two or more panes). In at least one embodiment, the client application divides the display into at least a first pane and a second pane. The notary support system can provide the video chat in the first pane while concurrently providing at least one notarization interface corresponding to the notarization trigger in the second pane. As mentioned, the client device can receive the at least one notarization interface in conjunction with the corresponding notarization trigger. In some embodiments, however, in response to receiving the notarization trigger, the client device retrieves, renders, or otherwise surfacers the at least one corresponding notarization interface.

The at least one notarization interface associated with the notary workflow can include one or more of various interfaces that facilitate the notarization of a digital document. For example, the at least one notarization interface can include an identification card photo interface for capturing and/or transmitting one or more digital images of an identification card. The at least one notarization interface can further include at least one knowledge-based authentication interface that facilitates the answering of knowledge-based authentication security questions. Additionally, the at least one notarization interface can include one or more digital signature interfaces for capturing and/or transmitting one or more digital signatures to be applied to the digital document for notarization.

The notary support system can utilize the data received via the at least one notarization interface (e.g., digital images of an identification card or answers to knowledge-based security questions, digital signatures) to authenticate the user of the client device. Further, the notary support system can utilize the data received via the at least one notarization interface to generate, for the user of the client device, one or more digital signatures for the digital document. In some embodiments, the notary support system further generates one or more digital signatures for the notary associated with the notary support terminal. Additionally, in some instances, the notary support system further applies an electronic notary seal to the digital document.

Thus, the notary support system facilitates remote notarization of a digital document. In some implementations, upon notarization of the digital document, the notary support system generates a digital record of the notarization and stores the digital record in association with the notary. In some cases, the notary support system further provides, to the client device, a link for accessing the notarized digital document. The notary support system can also render the notarized digital document tamper-evident as a precaution against fraudulent acts.

By concurrently providing a video chat and a notary workflow via at least one notarization interface, the notary support system enables a user of a client device to communicate with a notary to notarize a digital document via a client application. Indeed, the notary support system flexibly adapts to the needs of users by expanding upon the functionality offered by client applications. In particular, the notary support system flexibly provides functionality for a task (e.g., remote notarization) that requires assistance or supervision for completion. Additionally, the notary support system enables the notary to provide the digital document to be notarized, offering increased flexibility when compared to conventional software applications, which often require the user of the client device to provide the digital document.

Further, the client device displays the video chat and the at least one notarization interface concurrently using the same application, and thus requires fewer computer resources than a conventional system, such as memory, processing power, and display space. Accordingly, the client device uses a limited number of computer resources to perform functions faster than before. In particular, a user need not have a separate video chat application running together with the client application in order to communicate with a support representative while performing a task.

As illustrated by the foregoing discussion, the present disclosure uses a variety of terms to describe features and benefits of the customer support system. Additional detail is now provided regarding the meaning of these terms. For example, as used herein, the term "digital document" refers to an organization of digital data. In particular, a digital document can refer to data organized into a digital format and stored as one or more digital files. For example, a digital document can include, but is not limited to, a word processing file, a digital spreadsheet, or a PDF. A digital document can include a digitally created or digitally reproduced (e.g., scanned or photographed) document. In some instances, a digital document contains legal, financial, and/or business significance. For example, a digital document can include a contract or loan application. As used herein, the term "notarized digital document" refers to a digital document that has been notarized. For example, a notarized digital document can include a digital document that has been signed by one or more parties that have been authenticated and signed and sealed by a notary.

Additionally, as used herein, the term "notary" refers to a person that is legally authorized to perform certain acts. For example, a notary can refer to a person authorized by a local, regional (e.g., state), or federal government or some other government entity to perform certain acts with legal, financial, and/or business implications. For example, a notary can include a person authorized to witness the signing of one or more documents, including digital documents.

Further, as used herein, the term "video chat" (or "video chat session") refers to a communication having a video element. In particular, a video chat can refer to a multi-directional communication involving at least two computing devices (e.g., a client device and a notary support terminal) in which users of the computing devices (e.g., a user of the client device and a notary associated with the notary support terminal) can communicate and at least one of the computing devices displays a video capturing a video element of the communication. For example, at least one of the computing devices can display a video stream captured by a camera associated with the at least one other computing device participating in the video chat.

As used herein, the term "notary workflow" refers to a plurality of tasks for notarizing a digital document. In particular, a notary workflow can refer to a sequence of tasks (or one of many possible sequence of tasks) to be completed to notarize a digital document. For example, a notary workflow can include one or more tasks for authenticating a user of a client device, collecting signatures (e.g., digital signatures) from the user of the client device and/or the notary, and/or applying a notary seal (e.g., an electronic notary seal) to a digital document. In one or more embodiments, the notary support system executes a notary workflow using one or more notarization interfaces.

As used herein, the term "notarization interface" refers to a user interface for notarizing a digital document. In particular, a notarization interface can refer to a user interface a user of a client device can review or with which the user can interact as part of the notarization process. For example, a notarization interface can include a user interface through which a user of a client device can provide information that is relevant to the notarization process. In one or more embodiments, a notarization interface is associated with a notary workflow. In other words, execution of notary workflow includes the completion of one or more tasks that correspond to the notarization interface.

In one or more embodiments, a notarization interface includes an identification card photo interface. As used herein, the term "identification card photo interface" refers to a notarization interface for capturing and/or transmitting one or more digital images (e.g., digital still images or digital videos). In particular, an identification card photo interface can refer to a notarization interface for capturing one or more digital images of an identification card of a user of a client device. As used herein, the term "identification card" refers to a form of identification associated with a person (e.g., a user of a client device). For example, an identification card can include a government-issued form of identification, such as a driver's license, a passport, a federal or state identification card, or a military identification card. In some cases, an identification card includes some other form of identification, such as a school-issued identification card. An identification card can include a physical form or a digital form of identification. In many instances, an identification card includes an image (e.g., a photograph) of the corresponding person.

In some embodiments, a notarization interface includes a knowledge-based authentication interface. As used herein, the term "knowledge-based authentication interface" includes a notarization interface for providing information relevant to knowledge-based authentication. In particular, a knowledge-based authentication interface can refer to a notarization interface for answering one or more security questions used for knowledge-based authentication.

As used herein, the term "knowledge-based authentication" refers to a process of authenticating a person (e.g., a user of a client device) based on knowledge provided by the person. In particular, knowledge-based authentication refers to a process of determining whether a purported identity of a person is legitimate (e.g., the person is not lying about their identity). Relatedly, as used herein, the term "knowledge-based authentication security question" refers to a question that is presented for the purpose of authenticating a person (e.g., a user of a client device) via knowledge-based authentication. In particular, a knowledge-based authentication security question can refer to a question that requests information that is unknown or uncommonly known among people other than the identity claimed by the person to be authenticated. For example, a knowledge-based authentication security question can include a question that asks for personal information about the identity claimed by the person to be authenticated, such as birthdate, city of birth, mother's maiden name, favorite athlete, first car, etc. In one or more embodiments, a knowledge-based authentication interface includes one or more knowledge-based authentication security questions and/or interactive elements for answering the one or more knowledge-based authentication security questions.

As used herein, the term "notarization trigger" refers to an instruction to display a notarization interface. In particular, a notarization trigger can refer to an instruction executed on a computing device (e.g., a client device) to provide a corresponding notarization interface (or a corresponding sequence of notarization interfaces) on a display of a computing device. Execution of a notarization trigger can further include locating, retrieving, rendering, or otherwise surfacing the notarization interface (or sequence of notarization interfaces). For example, in some cases, a notarization trigger includes a segment of code that includes an instruction to display a corresponding notarization interface. A notarization trigger can further include an indication of the corresponding notarization interface (e.g., identifies the notarization interface to be displayed). In some implementations, a notarization trigger further includes an instruction to divide the display of the client device into at least two panes. Though the notary support system utilizes a separate display trigger in some cases.

As used herein, the term "authenticity" refers to the truthfulness, validity, or legitimacy of a person. In particular, authenticity can refer to the validity or legitimacy of a purported identity of a person (e.g., a user of a client device) signing a digital document. For example, in one or more embodiments, the notary support system determines the authenticity of a person by determining that the person is who they represent themselves to be (e.g., the person is not lying about their identity). Relatedly, as used herein, the term "indication of authenticity" can refer to a piece of information relevant to the authenticity of a person. In particular, an indication of authenticity can refer to a piece of information that indicates the validity or legitimacy of a purported identity of a person. To illustrate, an indication of authenticity can include an "indication of identification validation" that indicates an identification card associated with the person is valid, legitimate, authentic, and/or legal (e.g., not a fake ID). Further, an indication of authenticity can include an "indication of satisfaction of key security questions" that indicates that the person has answered one or more knowledge-based authentication security questions with sufficient accuracy to show that the purported identification of the person is legitimate.

Additionally, as used herein, the term "digital signature" refers to digital data that represents the signature of a person. In particular, a digital signature can refer to a digitally created or digitally reproduced signature of a person. For example, a digital signature can correspond to a user of a client device or a user of a notary support terminal (e.g., a notary). As used herein, the term "digital notary signature" more particularly refers to a digital signature corresponding to a notary.

Further, as used herein, the term "electronic notary seal" refers to an electronic seal associated with a notary. In particular, an electronic notary seal can refer to an electronic representation of a seal associated with a government or government entity showing that a person has been authorized to perform notary functions. In one or more embodiments, an electronic notary seal authenticates the signature of a notary (e.g., a digital notary signature).

As used herein, the term "digital field" refers to a digital space that enables some input. In particular, a digital field refers to a digital space associated with a digital document (e.g., overlaying a portion of the digital document) through which input can be provided. The notary support system can apply the input provided via a digital field to the corresponding portion of the digital document. To illustrate, a digital field can include a digital signature field for input of a digital signature. Also, a digital field can include an electronic notary seal field for input of an electronic notary seal.

Additionally, as used herein, the term "digital record" includes a collection of digital data that corresponds to the notarization of a digital document. In particular, a digital record can include a collection of digital data that represents, records, and/or confirms that a digital document has been notarized. For example, a digital record can have information that includes, but is not limited to, the name of the user of the client device, the date of notarization, the time of notarization, the type of digital document notarized, or notes provided by the notary.

Though the following generally discusses implementations of methods, systems, and non-transitory computer-readable media with reference to a user accessing and interacting with the notary support system using a mobile application on a mobile device, it will be appreciated that the methods, systems, and non-transitory computer-readable media are equally effective for users using client applications on other types of client devices.

Additional detail regarding the notary support system will now be provided with reference to the figures. For example, FIG. 1 illustrates a schematic diagram of an exemplary system environment ("environment") 100 in which a notary support system 106 can be implemented. As illustrated in FIG. 1, the environment can include a server(s) 102, a network 108, a third-party system(s) 110, a Websocket server 112, a notary support terminal 114, a client device 116, and a peer-to-peer connection 120.

Although the environment 100 of FIG. 1 is depicted as having a particular number of components, the environment 100 can have any number of additional or alternative components (e.g., any number of servers, third-party systems, Websocket servers, notary support terminals, client devices, or other components in communication with the notary support system 106 via the network 108). Similarly, although FIG. 1 illustrates a particular arrangement of the server(s) 102, the network 108, the third-party system(s) 110, the Websocket server 112, the notary support terminal 114, and the client device 116, various additional arrangements are possible.

Figure 13:
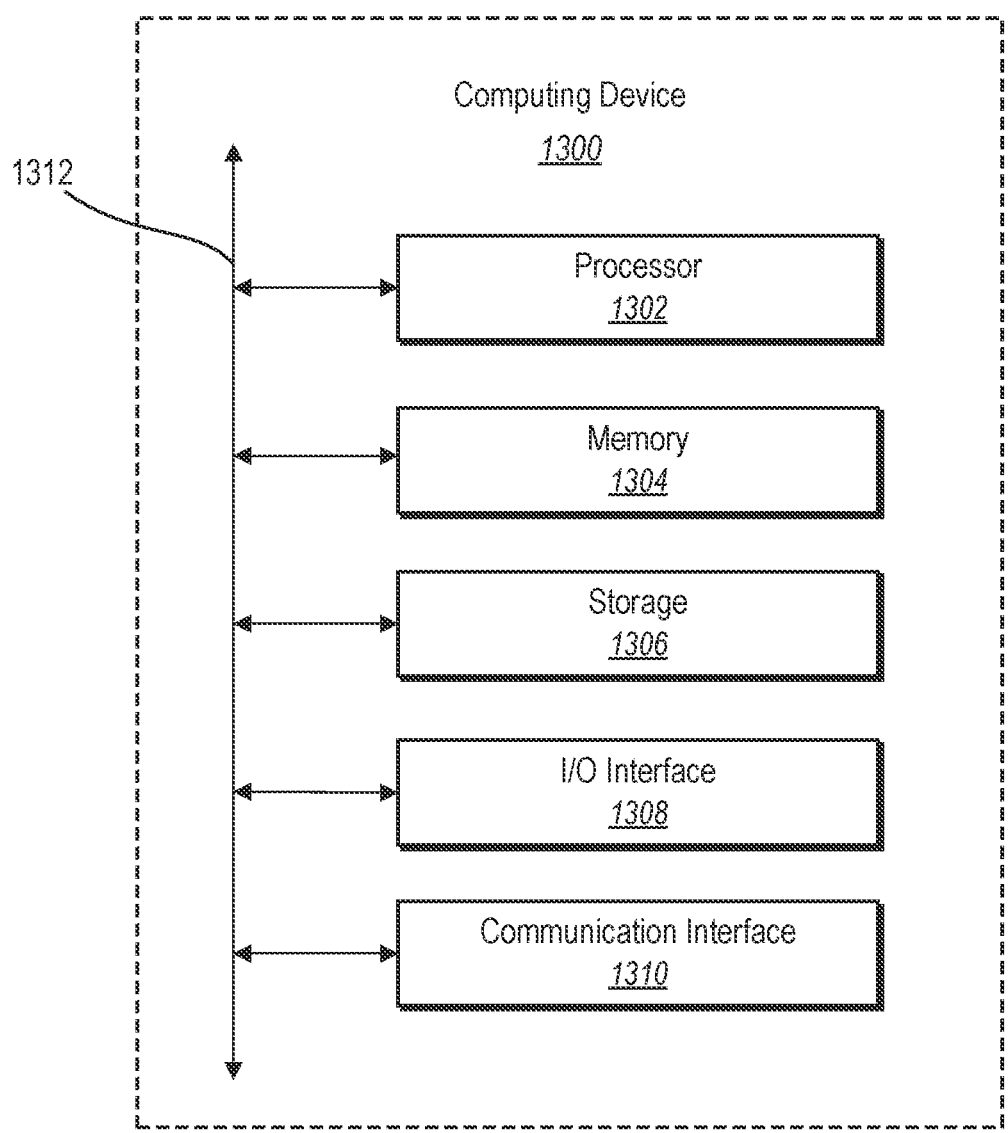
FIG. 13 illustrates a block diagram of an exemplary computing device in accordance with one or more embodiments.

The server(s) 102, the network 108, the third-party system(s) 110, the Websocket server 112, the notary support terminal 114, and the client device 116 may be communicatively coupled with each other either directly or indirectly (e.g., through the network 108 as discussed in greater detail below in relation to FIG. 13). Moreover, the server(s) 102, the third-party system(s) 110, the Websocket server 112, the notary support terminal 114, and the client device 116 may include a variety of computing devices (including one or more computing devices as discussed in greater detail with relation to FIG. 13).

As mentioned above, the environment 100 includes the server(s) 102. The server(s) 102 can generate, store, receive, and/or transmit data, including notarization interfaces, notarization triggers, data resulting from a user interaction with a notarization interface (e.g., a digital image of an identification card, etc.), video data, or a video chat request. For example, the server(s) 102 can transmit a notarization trigger to a client device via one connection, while conducting a video chat between the client device and a notary support terminal through another connection. In particular, the server(s) 102 can utilize a push token to send a notarization trigger to a native application (e.g., the client application 118) on the client device 116. The server(s) 102 can receive user input through a corresponding notarization interface or one or more user interactions with the notarization interface for notarizing a digital document. In one or more embodiments, the server(s) 102 comprises a data server. The server(s) 102 can also comprise a communication server or a web-hosting server.

In one or more embodiments, the server(s) 102 establishes a connection between the notary support terminal 114 and a client device (e.g., the client device 116). For example, the server(s) 102 can establish a connection in response to a video chat request sent by the client device 116. In particular, the server(s) 102 establishes the connection to allow transmission of a video chat between the notary support terminal 114 and the client device 116. For example, once the server(s) 102 establishes a connection, the server(s) 102 conducts a video chat between the notary support terminal 114 and the client device 116 through that connection. A notary and a user can interact with the notary support terminal 114 and the client device 116, respectively, to communicate with one another via the video chat.

As illustrated, in one or more embodiments, the server(s) 102 comprises one server. Alternatively, the server(s) 102 may comprise a series of servers. For example, the server(s) 102 can comprise a video load balance server, a signaling server, and a STUN/TURN server. The video load balance server serves to direct communications to an available support terminal, the signaling server notifies the available support terminal of a video chat request, and the STUN/TURN server serves to work through secure firewalls to establish the connection. Alternatively, any other combinations and types of servers sufficient to establish a connection may be used as part of the server(s) 102.

Additionally, the server(s) 102 includes a customer support system 104. In particular, in one or more embodiments, the customer support system 104 provides functionality by which a user of a client device can obtain support from a notary. For example, the customer support system 104 can utilize the server(s) 102 to identify and establish communications with an available notary. For example, the customer support system 104 can determine that a video chat request has been received and identify an available notary. In some cases, the customer support system 104 determines that a particular notary has been requested and determine whether or not the notary is available.

Additionally, the server(s) 102 include the notary support system 106. Indeed, in one or more embodiments, the notary support system 106 utilizes the server(s) 102 to facilitate the notarization of a digital document. To illustrate, the notary support system 106 can utilize the server(s) 102 to establish a video chat session between a client device (e.g., the client device 116) and a notary support terminal (e.g., the notary support terminal 114). The notary support system 106 can further utilize the server(s) 102 to provide the video chat within a first pane displayed on the client device while concurrently providing a notarization interface within a second pane displayed on the client device. During the video chat, the notary support system 106 can utilize the server(s) 102 to notarize the digital document by authenticating the user of the client device, generating one or more digital signatures for the digital document, and applying an electronic notary seal to the digital document.

As shown in FIG. 1, the environment 100 also includes the notary support terminal 114. The notary support terminal 114 may comprise a computing device, such as those described below in relation to FIG. 13. For example, the notary support terminal 114 may comprise one or more personal computers, laptop computers, mobile devices, mobile phones, tablets, special purpose computers, televisions, or other computing devices. As shown, the notary support terminal 114 can also include the customer support system 104 and the notary support system 106. Indeed, in one or more embodiments, the notary support terminal 114 can execute or implement the notary support system 106 (e.g., via the customer support system 104). In some embodiments, the notary support terminal 114 executes or implements all features of the notary support system 106 (and the customer support system 104). In some embodiments, however, the notary support terminal 114 executes or implements a subset of the features. For example, the notary support terminal 114 can implement a first subset of features of the notary support system 106, and the server(s) 102 can implement a second subset of features of the notary support system 106 (which may, or may not, overlap with the first subset of features).

As further shown in FIG. 1, the environment 100 includes the third-party system(s) 110. In one or more embodiments, the third-party system(s) 110 includes a third-party system for analyzing digital images depicting an identification card associated with a user. Accordingly, in some implementations, the notary support system 106 transmits the digital images of the identification card to the third-party system(s) 110 and receives an indication of identification validation in return. In some cases, the third-party system(s) 110 includes a third-party system for providing a solution to knowledge-based authentication security questions. Accordingly, in some cases, the notary support system 106 provides answers to knowledge-based authentication security questions received from the client device and receives an indication of satisfaction of the knowledge-based authentication security questions in return. In some implementations, the third-party system(s) 110 includes a third-party system for rendering a notarized digital document tamper-evident.

In one or more embodiments, the client device 116 includes a client device that allows a user of the device to receive and interact with notarization interfaces. For example, the client device 116 can include a smartphone, a tablet, a desktop, a computer, a laptop computer, or another electronic device. The client device 116 can include one or more applications (e.g., the client application 118) that allow the user to receive and interact with notarization interfaces. For example, the client application 118 can include a software application installed on the client device 116. Additionally, or alternatively, the client application 118 can include a software application hosted on the server(s) 102 or notary support terminal 114, which may be accessed by the client device 116 through another application, such as a web browser.

As is also illustrated in FIG. 1, the environment 100 may also include the Websocket server 112. The Web socket server 112 may generate, store, receive, and transmit any type of data, including a notarization trigger (not shown). For example, the Web socket server 112 may receive and push a notarization trigger sent from the notary support terminal 114 to the client device 116.

As shown in FIG. 1, the notary support terminal 114 can communicate with the client device 116 through the server(s) 102, the Websocket server 112, and/or the peer-to-peer connection 120. For example, the notary support terminal 114 can communicate with the client device 116 using two or more channels of communication. To illustrate, the notary support terminal 114 can conduct a video chat with the client device 116 through the server(s) 102 or the peer-to-peer connection 120 while concurrently pushing notarization triggers (and, possibly, the corresponding notarization interfaces) to the client device 116 through the Web socket server 112.

In particular, the peer-to-peer connection 120 serves as a direct connection between the notary support terminal 114 and the client device 116. In one or more embodiments, the peer-to-peer connection 120 can serve to substitute for the server(s) 102. For example, after the server(s) 102 establishes the connection between the notary support terminal 114 and the client device 116, the notary support terminal 114 can subsequently establish the peer-to-peer connection 120 and conduct the video chat over that connection. As used herein, a peer-to-peer (P2P) connection is created when two or more client computing devices are connected and share resources without going through a separate server computing device (e.g., the server(s) 102). The peer-to-peer connection 120 can provide a solution to bandwidth limitations that restrict the maximum number of concurrent video streams possible through the server(s) 102. The peer-to-peer connections, where possible, maximize the number of possible simultaneous video calls.

In one or more embodiments, the server(s) 102 may first determine if the peer-to-peer connection 120 is available. For example, the peer-to-peer connection 120 may be unavailable due to limitations or the configuration of the hardware or software within the environment 100. For example, video relays between client devices on restrictive networks and firewalls are often blocked. Network address translation limits the client device's ability to have peer-to-peer connections. In one or more embodiments, the server(s) 102 detects when a peer-to-peer connection is not possible. If the server(s) 102 determines that the peer-to-peer connection 120 is not available, then the server(s) 102 may maintain (or reroute) the connection for the video chat. In an alternative embodiment, the server(s) 102 may maintain the connection with a client device whether or not the peer-to-peer connection 120 is available.

As mentioned, the notary support system 106 can be implemented in whole, or in part, by the individual elements of the environment 100. Indeed, although FIG. 1 illustrates the notary support system 106 being implemented by the server(s) 102 and/or the notary support terminal 114, it will be appreciated that one or more components of the notary support system 106 can be implemented by a variety of devices within the environment 100. For example, one or more (or all) components of the notary support system 106 can be implemented by a different computing device (e.g., the client device 116), a separate server from the server(s) 102 hosting the customer support system 104, or a separate notary support terminal from the notary support terminal 114. Example components of the notary support system 106 will be discussed in more detail with regard to FIG. 11 below.

Figure 2:
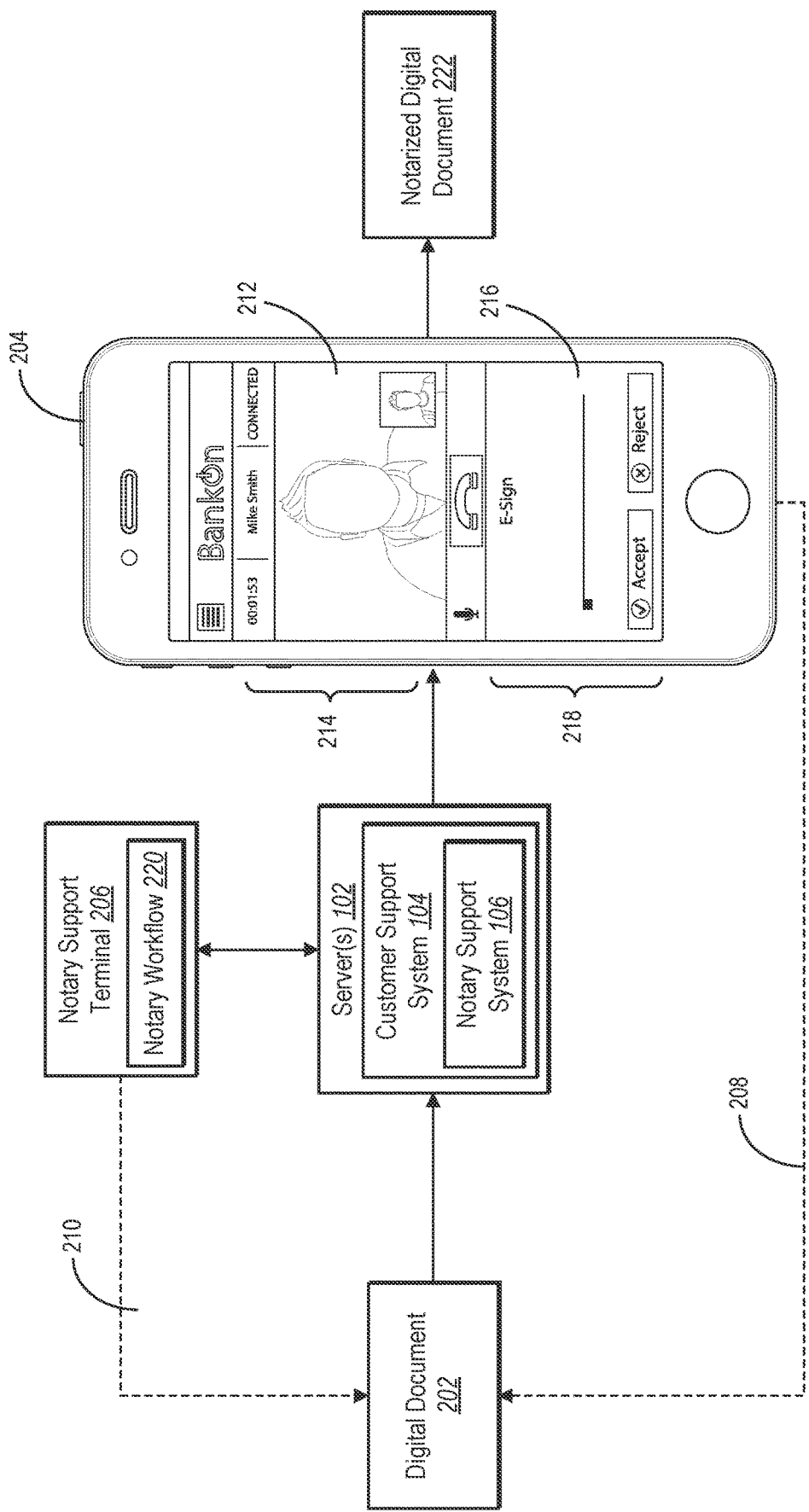
FIG. 2 illustrates an overview diagram for notarizing a digital document during a video chat displayed in a multi-pane display of a mobile device in accordance with one or more embodiments.

As discussed above, in one or more embodiments, the notary support system 106 can facilitate remote notarization of a digital document during a video chat displayed in a multi-pane (e.g., split-screen) display on a client device, such as a mobile device. FIG. 2 illustrates an overview diagram for remotely notarizing a digital document during a video chat displayed in a multi-pane display of a mobile device in accordance with one or more embodiments.

As shown in FIG. 2, the notary support system 106 obtains a digital document 202. The digital document 202 includes a digital document to be notarized based on participation of a user of a mobile device 204 and a notary associated with a remote notary support terminal 206. In one or more embodiments, the notary support system 106 receives the digital document 202 from the mobile device 204 (as shown by the arrow 208). In some implementations, the notary support system 106 receives the digital document 202 from the notary support terminal 206 (as shown by the arrow 210) or from an entity—such as a financial institution—associated with the notary support terminal 206. In some cases, the notary support system 106 accesses the digital document 202 from a database that stores digital documents. For example, in some embodiments, the notary support system 106 maintains a database of digital documents (e.g., template digital documents) that may require notarization. Accordingly, the notary support system 106 can retrieve the digital document 202 from this database in some cases. Thus, the notary support system 106 offers flexibility in how a digital document is provided when compared to many conventional software applications that would require the user of the mobile device 204 to provide the digital document.

As further shown in FIG. 2, the notary support system 106 provides a video chat 212 for display on the mobile device 204. In particular, the notary support system 106 provides the video chat 212 for display within a first pane 214 displayed on the mobile device 204. The video chat 212 displays video communications between the user of the mobile device 204 and the notary associated with the notary support terminal 206. In some implementations, the notary support system 106 establishes the video chat in response to receiving a request for video communications from the mobile device 204 as will be discussed in more detail below.

In one or more embodiments, the notary support system 106 facilitates onboarding or registration of the notary before the video chat 212 is established. To illustrate, in some implementations, the notary support system 106 receives, from the notary, notary commission details provided by the commissioning entity. The notary commission details can include one or more of a commission number, the commissioning state (or other commissioning government), commission dates (e.g., issue date and expiration date), a copy of the commission certificate, proof of insurance, proof of bond (e.g., if required by the commissioning government), an electronic notary seal, digital signature certificate, and a geolocation. In some instances, the notary support system 106 further validates the notary commission details (e.g., with a third-party system) before enabling the notary to register.

Additionally, as shown in FIG. 2, the notary support system 106 provides a notarization interface 216 for display on the mobile device 204. In particular, the notary support system 106 provides the notarization interface 216 for display within a second pane 218 displayed on the mobile device 204. In one or more embodiments, the notarization interface 216 is associated with a notary workflow, such as the notary workflow 220 stored on or otherwise accessible to the notary support terminal 206 or the client device 204. Indeed, as will be discussed in more detail below, in some cases, the notary support system 106 provides the notarization interface 216 for display on the mobile device 204 in response to execution of the notary workflow 220 by the notary support terminal. For example, in some implementations, the notary support system 106 transmits a notarization trigger and the notarization interface 216 to the mobile device 204, causing the mobile device 204 to display the notarization interface 216. In some instances, the notary support system 106 transmits the notarization trigger and the mobile device 204 retrieves, renders, or otherwise surfaces the notarization interface 216 without needing to receive the notarization interface 216 from the notary support terminal 206.

As further shown in FIG. 2, the notary support system 106 generates a notarized digital document 222. In particular, the notary support system 106 generates the notarized digital document 222 by notarizing the digital document 202. In some implementations, the notary support system 106 generates the notarized digital document 222 based on user input received through (or user interactions with) the notarization interface 216. The notary support system 106 can generate the notarized digital document 222 further based on user input received through (or user interactions with) one or more additional notarization interfaces. For example, in some implementations, the notary workflow 220 comprises a plurality of (e.g., a sequence of) notarization interfaces for notarizing a digital document. The notary support system 106 can provide each of these notarization interfaces (e.g., in sequence), receive user input, and generate the notarized digital document 222 accordingly.

Figure 3:
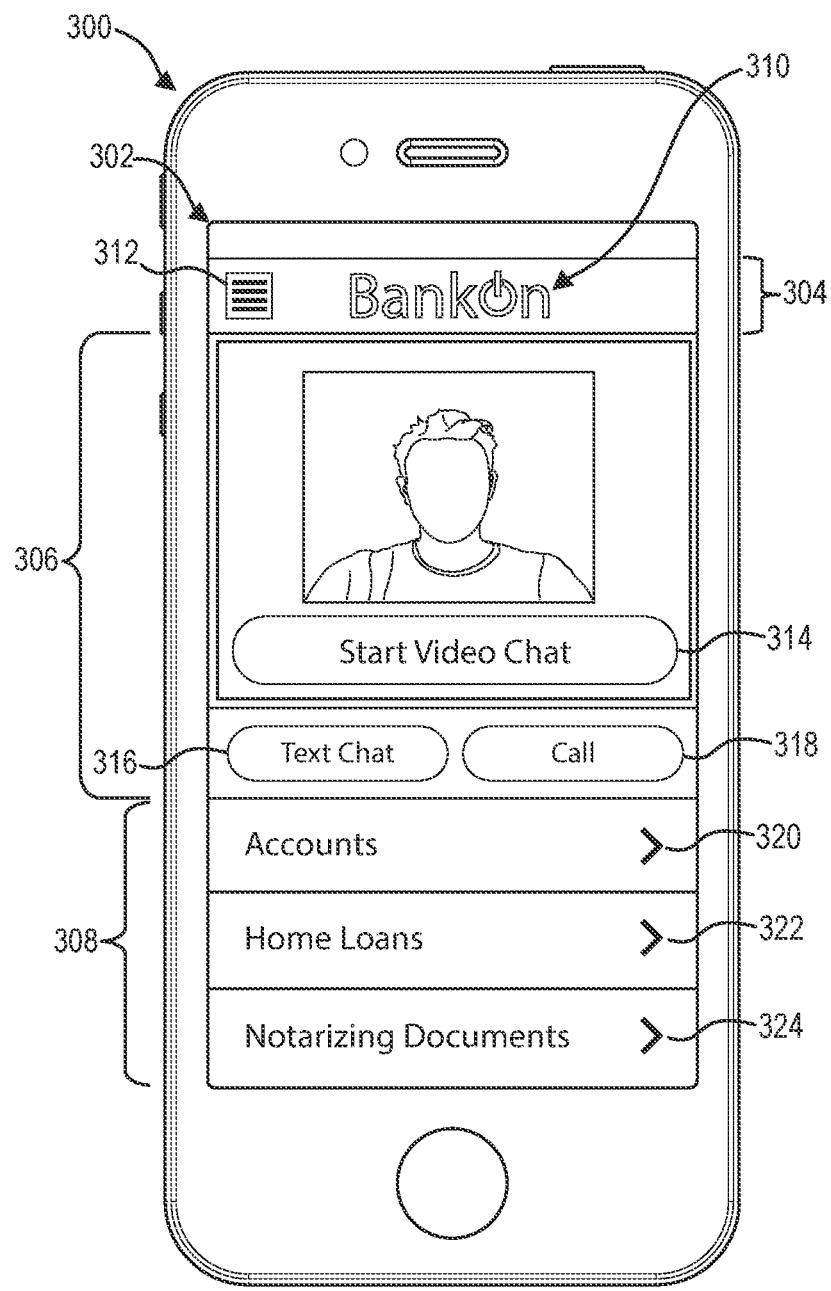
FIG. 3 illustrates a mobile device displaying an application user interface operable to enable a mobile device user to interact with a mobile application in accordance with one or more embodiments.

In one or more embodiments, the notary support system 106 provides a video chat for display on a client device, such as a mobile device, in response to user interactions with an application user interface. FIG. 3 illustrates a mobile device 300 displaying an application user interface 302 operable to allow a user to interact with a mobile application in accordance with one or more embodiments. The application user interface 302 includes a heading portion 304, a customer support portion 306, and a navigation portion 308. In alternate embodiments, the application user interface 302 may include any other portions relevant to the mobile application.

Heading portion 304 of application user interface 302 provides general information and options for the user. FIG. 3 illustrates heading portion 304 providing a title 310 and a menu 312. The title 310 provides the title of the business but may alternatively provide the name of the mobile application or any other title deemed sufficient for the purposes of the mobile application. The menu 312 provides a drop-down menu with pre-selected options for interacting with the mobile application. For example, the drop-down menu provides the user with an option of logging into a user account or navigating to a home page of the mobile application. In one or more alternative embodiments, the menu 312 may be replaced with links in the heading portion 304 providing the user with similar options.

Customer support portion 306 provides an option to contact a support representative, such as a notary, to receive assistance. For example, a user who is unfamiliar with a mobile application may need assistance in finding information or performing a desired function, such as notarizing a digital document. By way of illustration, in the context of a mobile banking application, the user may require assistance in notarizing a digital document when applying for a home loan, a car loan, a business loan, or when otherwise entering into a contract with the corresponding financial institution.

As illustrated in FIG. 3, the customer support portion 306 includes multiple selectable buttons the user can select to contact a support representative, such as a notary. For example, the customer support portion 306 of FIG. 3 includes a video chat button 314, a text chat button 316, and a phone call button 318, which the mobile application may use to initiate a video chat, a text chat, or a phone call respectively. In response to a selection, the mobile device 300 sends a request to initiate a communications session of the type associated with the button. For example, by selecting the video chat button 314, the mobile device 300 sends a request to begin a video chat session with a support representative, such as a notary. In some implementations, in response to a selection of one of the video chat button 314, the text chat button 316, or the phone call button 318, the customer support portion 306 provides additional options for selecting the type of support representative with which the user wishes to communicate (e.g., a notary or a general support representative for non-notary assistance).

Alternatively, the customer support portion 306 may include other selectable buttons to contact the support representative, such as an option to e-mail or send a voice-recorded message. It will also be appreciated that any number of selectable buttons may be present in the customer support portion 306 in any combination. To illustrate, the customer support portion 306 may include selectable buttons for video chat, text chat, phone call, and email message, or the customer support portion 306 may only include the video chat button 314.

The navigation portion 308 presents the user with quick navigational options. For example, the navigation portion 308 of FIG. 3 presents options to navigate to a page comprising information on accounts 320, information on home loans 322, or information on notarizing documents 324. In some cases, other options deemed useful to the user may also be present.

Figure 4:
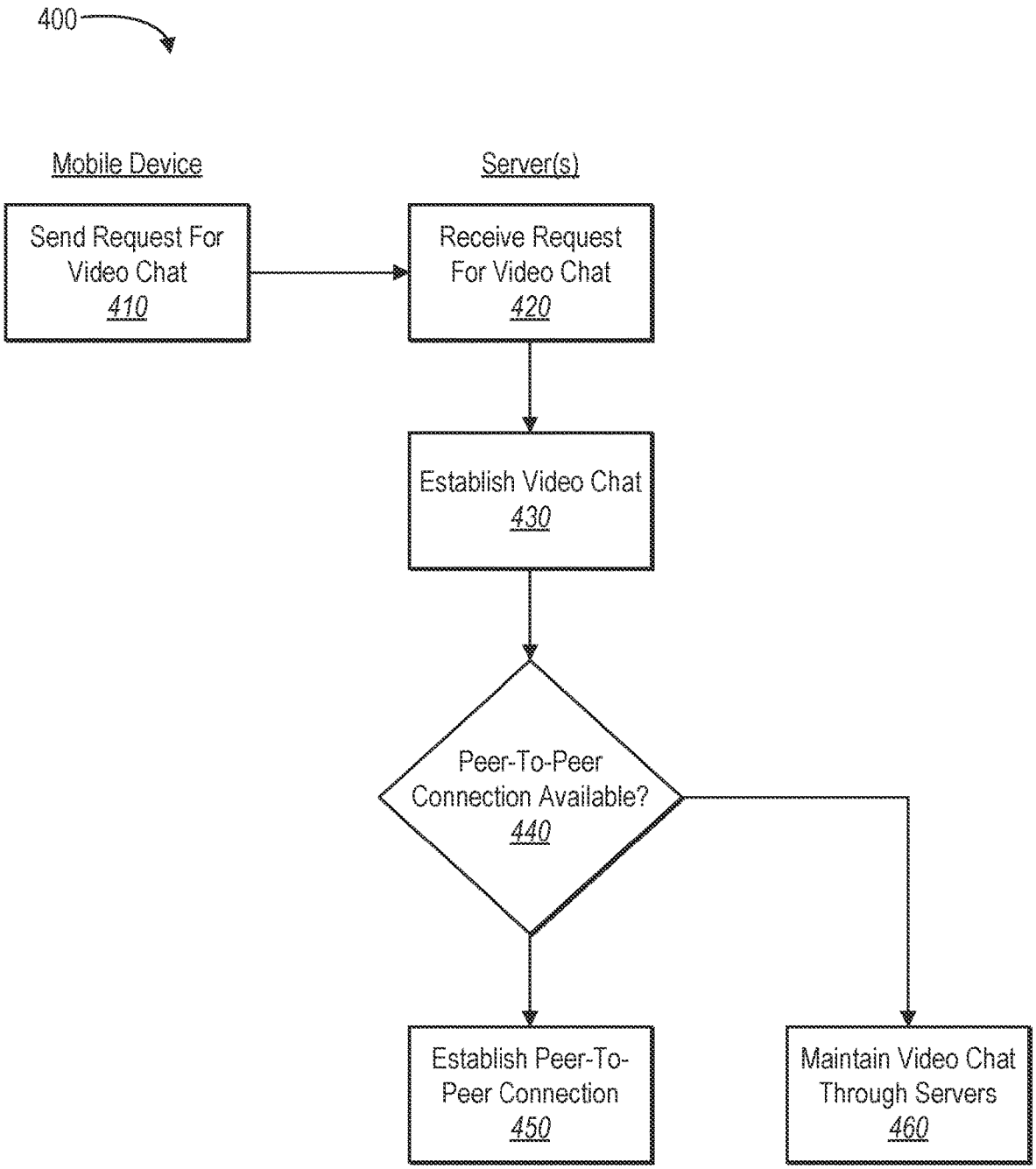
FIG. 4 illustrates a flowchart of a series of acts in a method of initiating a video chat connection between a mobile device and a support terminal in accordance with one or more embodiments.

As mentioned previously, one or more embodiments include a video chat between a client device (e.g., a mobile device) and a notary support terminal. FIG. 4 illustrates a flowchart of a series of acts 400 of initiating a video chat connection between a mobile device and a notary support terminal in accordance with one or more embodiments. Though FIG. 4 illustrates the series of acts 400 implemented in the context of a user using a mobile device, one or more embodiments involve the user utilizing another type of client device (e.g., desktop, laptop, tablet, etc.). In one or more embodiments, the series of acts 400 is performed in a hardware environment that includes the environment 100. The series of acts 400 is intended to be illustrative of one or more methods in accordance with the present disclosure and is not intended to limit potential embodiments. Alternative embodiments can include additional, fewer, or different steps than those articulated in FIG. 4.

As illustrated in FIG. 4, the series of acts 400 includes an act 410 of sending, from a mobile device, a request to initiate a video chat. The request can initially be processed by a series of one or more servers, such as the server(s) 102 of FIG. 1. As discussed above, the server(s) 102 may contain a load balance server, a signaling server, and a STUN/TURN server. Alternatively, the request may be sent through a single server that performs the same functionality as the combination of servers. In particular, the act 410 includes sending a request from the mobile device to initiate a video chat between the mobile device and a notary support terminal.

Moreover, as illustrated in FIG. 4, the series of acts 400 also includes an act 420 of receiving the request to initiate a video chat. Furthermore, FIG. 4 illustrates that the series of acts 400 also includes an act 430 of establishing a video chat between the mobile device and a notary support terminal. In particular, the act 430 comprises establishing a first connection between the mobile device and the notary support terminal and conducting a video chat transmitted across the first connection. In particular, the first connection can comprise a connection established through the server(s) 102.

As shown in FIG. 4, the series of acts 400 also includes the act 440 of determining whether a peer-to-peer connection is available between the mobile device and the notary support terminal. In response to determining that a peer-to-peer connection is available, the series of acts 400 proceeds to the act 450 of establishing a peer-to-peer connection between the mobile device and the notary support terminal. In particular, the act 450 switches the video chat from being conducted via a connection through the server(s) 102 to a peer-to-peer connection (i.e., the peer-to-peer connection 120). In one or more embodiments, the act 450 may include severing the connection through server(s) 102 after the peer-to-peer connection has been established between the mobile device and the notary support terminal. One will appreciate in light of the disclosure herein that the use of a peer-to-peer connection to conduct the video chat can reduce system resources needed for the video chat, provide greater flexibility, and in some cases allow for quicker communication between the mobile device and the notary support terminal.

Alternatively, in response to determining that a peer-to-peer connection is not available, the series of acts 400 proceeds to the act 460 of maintaining the video chat through the server(s) 102. In one or more embodiments, the video chat may be maintained through the server(s) 102 whether or not a peer-to-peer connection is available.

Figure 5:
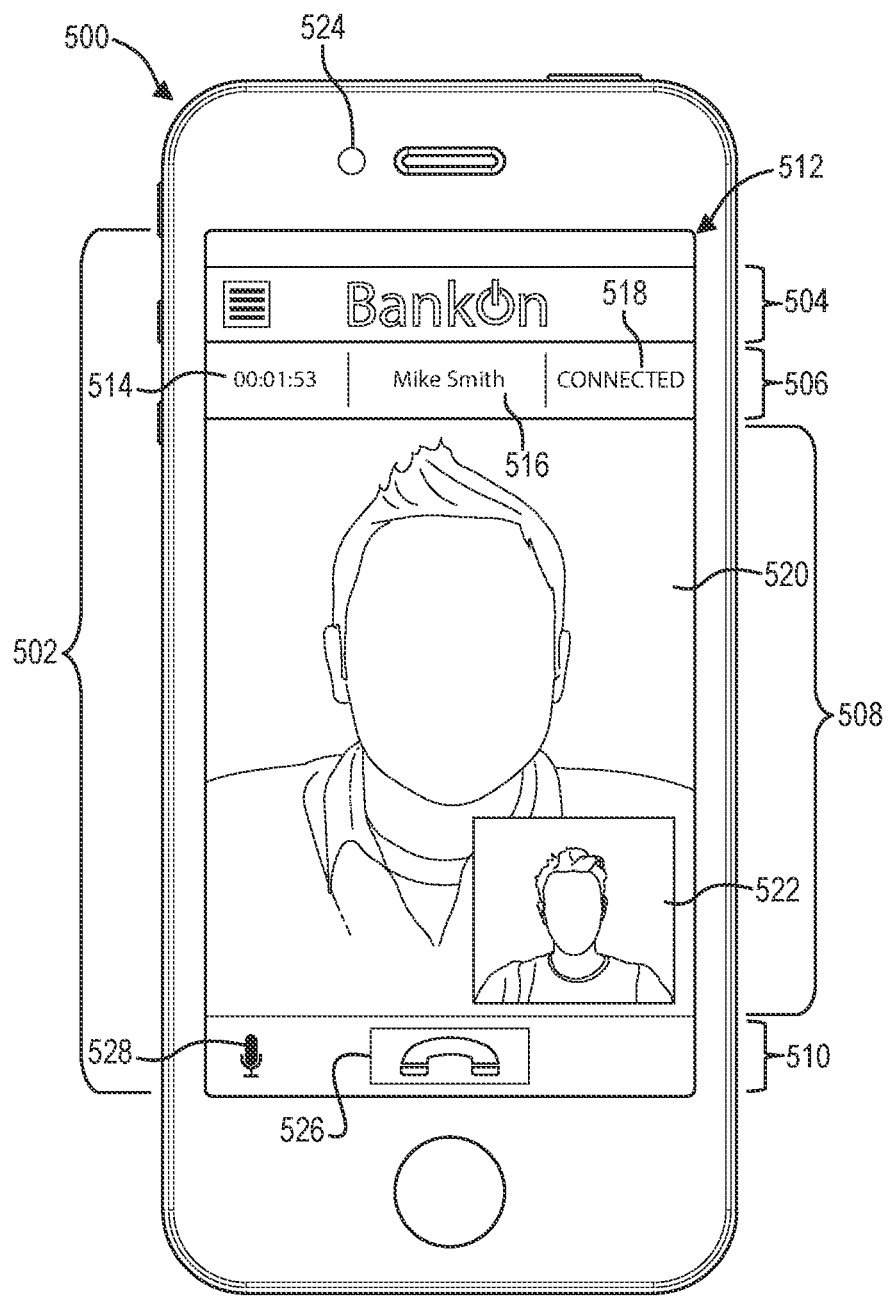
FIG. 5 illustrates a mobile device displaying a video chat interface in accordance with one or more embodiments.

As mentioned above, the notary support system 106 can establish a video chat between a client device, such as a mobile device, and a notary support terminal. Further, the notary support system 106 can provide the video chat for display on the client device. FIG. 5 illustrates a mobile device 500 displaying a video chat interface 502 after a video chat has been established between the mobile device 500 and a notary support terminal in accordance with one or more embodiments. The video chat interface 502 includes a heading portion 504, a session information portion 506, a video chat display portion 508, and a session control portion 510. As illustrated in FIG. 5, the video chat interface 502 utilizes the entirety of the mobile device display screen 512. In one or more alternative embodiments, the video chat interface 502 utilizes less than the entirety of the mobile device display screen 512 in response to receiving a default notarization trigger from a notary support terminal immediately after the video chat is established.

As illustrated in FIG. 5, the session information portion 506 of the video chat interface 502 displays information regarding the video chat session conducted between the mobile device 500 and the notary support terminal. In particular, the session information portion 506 includes a time-keeping portion 514, a notary identity portion 516, and a connection status portion 518. The time-keeping portion 514 displays the duration of the current video chat session. The notary identity portion 516 displays the name of the notary engaging in the video chat session. The connection status portion 518 displays the status of the connection between the mobile device 500 and the notary support terminal. In one or more embodiments, the connection status portion 518 can indicate whether the video chat is being conducted via a peer-to-peer connection or not.

As illustrated in FIG. 5, the video chat display portion 508 includes a notary display 520 and a mobile device user display 522. In particular, the notary display 520 displays video content captured by the notary support terminal. The mobile device user display 522 displays video content captured by a camera 524 of the mobile device 500. As shown in FIG. 5, the mobile device user display 522 is displayed in a lower right corner of the video chat display portion 508. Alternatively, the mobile device user display 522 may be displayed in another location of the video chat display portion 508. In one or more embodiments, the mobile device user display 522 may be relocated to another location in response to detecting a user interaction. For example, a user may select and, with a dragging motion, relocate the mobile device user display 522 to another location.

As further illustrated in FIG. 5, the session control portion 510 of the video chat interface 502 includes a session end option 526 and a microphone mute option 528. Alternatively, one or more embodiments may include other options, such as a record option to record the audio content, visual content, or both from the video chat session.

In establishing a video chat between a mobile device and a notary support terminal, the notary support system 106 (e.g., via the notary support terminal or a server) can send instructions to the mobile device to display the video chat concurrently with a notarization interface. For example, the notary support system 106 can send a notarization trigger to the mobile device that causes the mobile device to partition its display into multiple panes and to display the video chat in one pane and the corresponding notarization interface in another pane. As mentioned above, in some embodiments, the notary support system 106 (e.g., via the notary support terminal or a server) sends a separate display trigger, in addition to the notarization trigger, to cause the mobile device to partition its display. To illustrate, in some embodiment, a notarization trigger causes the mobile device to retrieve, render, or otherwise obtain a corresponding notarization interface and the display trigger separately causes the mobile device to partition its display so as to display the notarization interface concurrently with the video chat.

In one or more embodiments, the notarization trigger (and/or the display trigger) comprises a piece of JavaScript or other code that, when received by the mobile device, cause the mobile device to split the display into multiple panes. More specifically, the notarization trigger can cause the mobile device to execute code previously installed on the mobile device as part of the client application. Such code can cause the mobile device to provide multiple panes as described hereinafter. Much of the following discussion will provide exemplary embodiments of a mobile device displaying a dual pane display in which the mobile device displays one or more notarization interfaces concurrently with a video chat. Indeed, the mobile device can display one or more notarization interfaces that facilitate notarization of a digital document.

As previously mentioned, in one or more embodiments, the notary support system 106 facilitates execution of a notary workflow for notarizing a digital document. Indeed, as discussed above, a notary workflow can include a plurality of notarization interfaces (e.g., in a sequence of notarization interfaces) for notarizing a digital document. In some implementations, the notary support system 106 transmits, to the mobile device, a notarization trigger for each notarization interface associated with the notary workflow. In some cases, however, the notary support system 106 transmits a single notarization trigger corresponding to the entire notary workflow. To illustrate, in at least one instance, the notary support system 106 transmits, to the mobile device, a single notarization trigger that initiates the notary workflow. The notary support system 106 further provides a notarization interface that is the first in a sequence of notarization interfaces. After completion of the first notarization interface, the notary support system 106 can automatically provide the next notarization interface in the sequence.

Figure 6A:
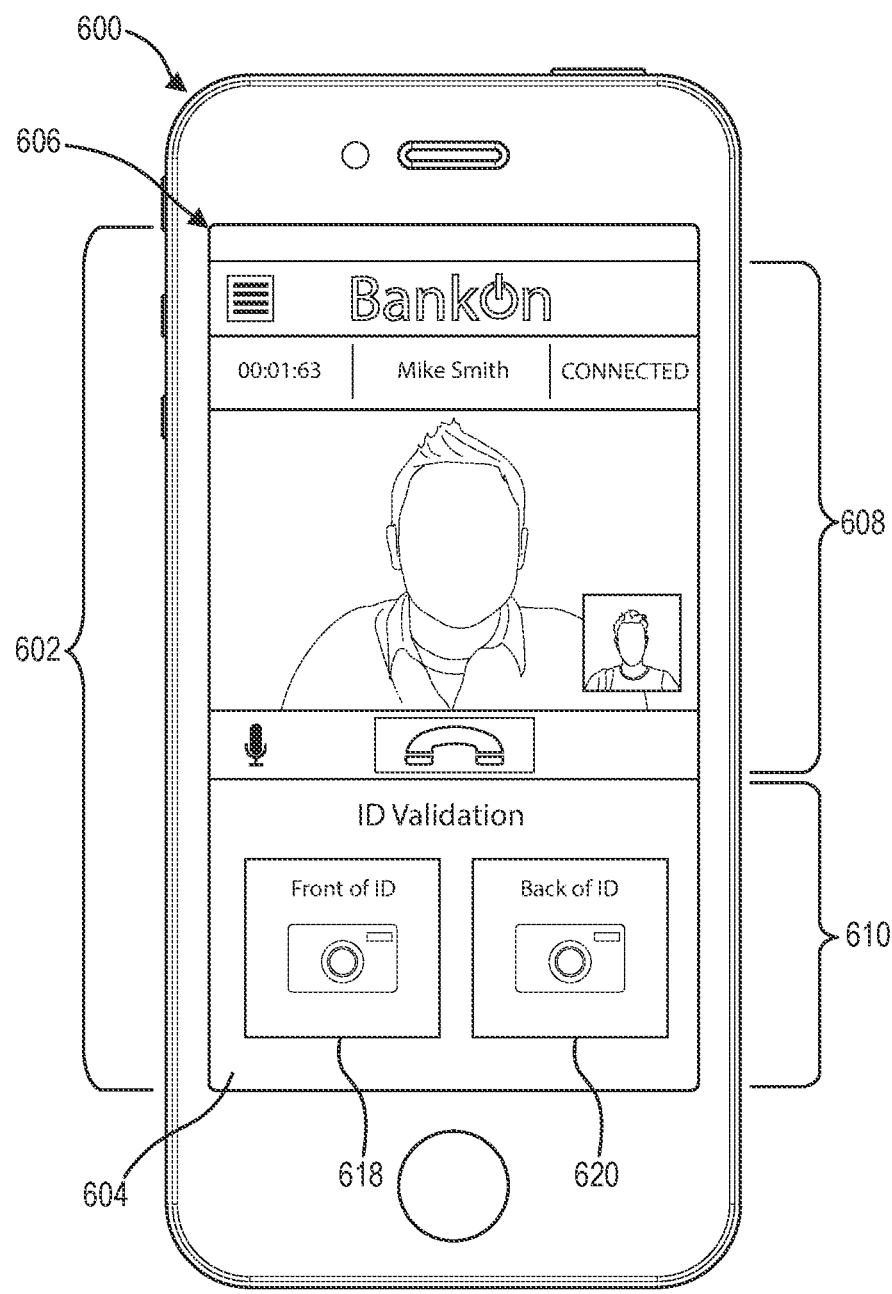
FIGS. 6A-6C illustrate a mobile device displaying a dual pane display in which the mobile device displays one or more notarization interfaces for capturing and/or transmitting digital images of an identification card concurrently with a video chat in accordance with one or more embodiments.
Figure 6B:
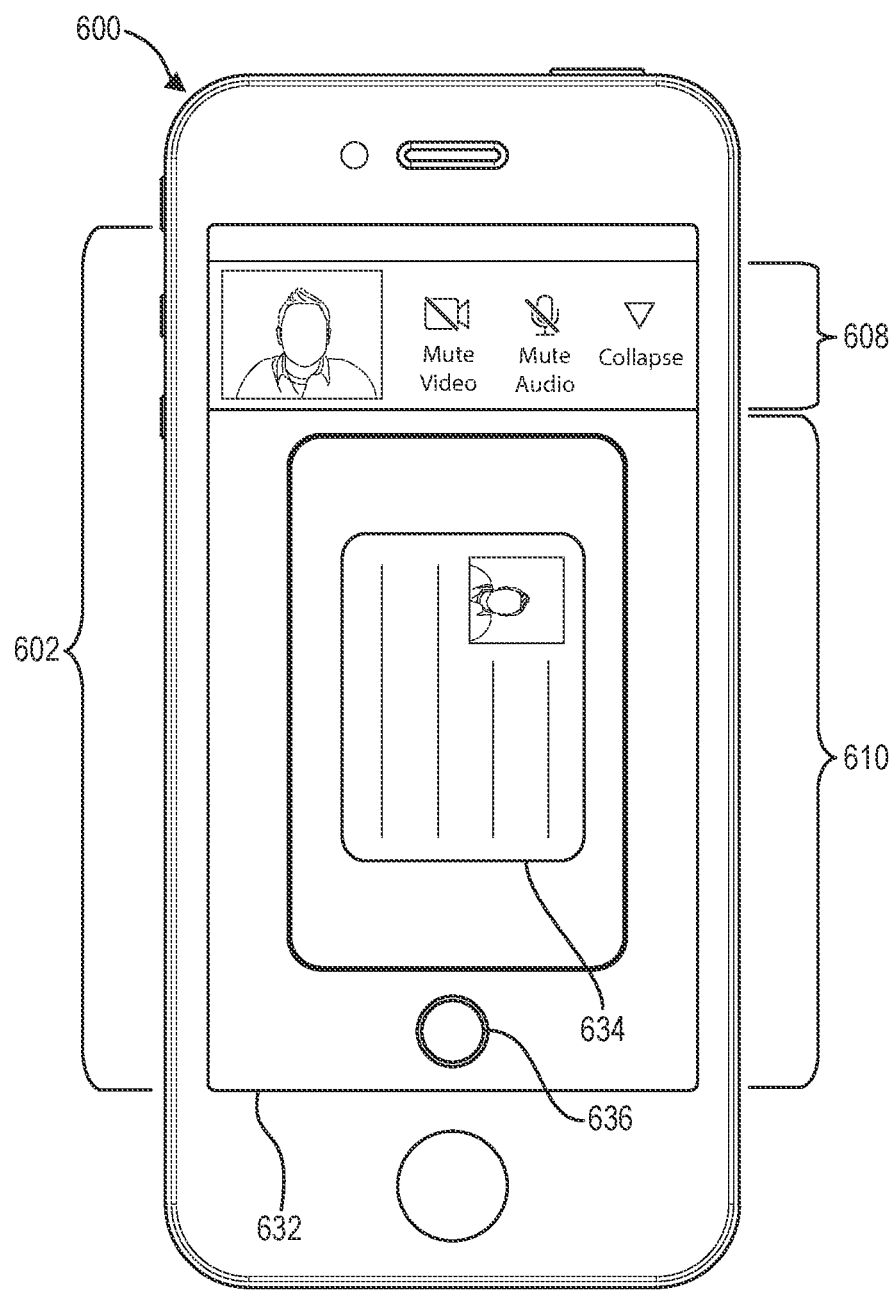
Figure 6C:
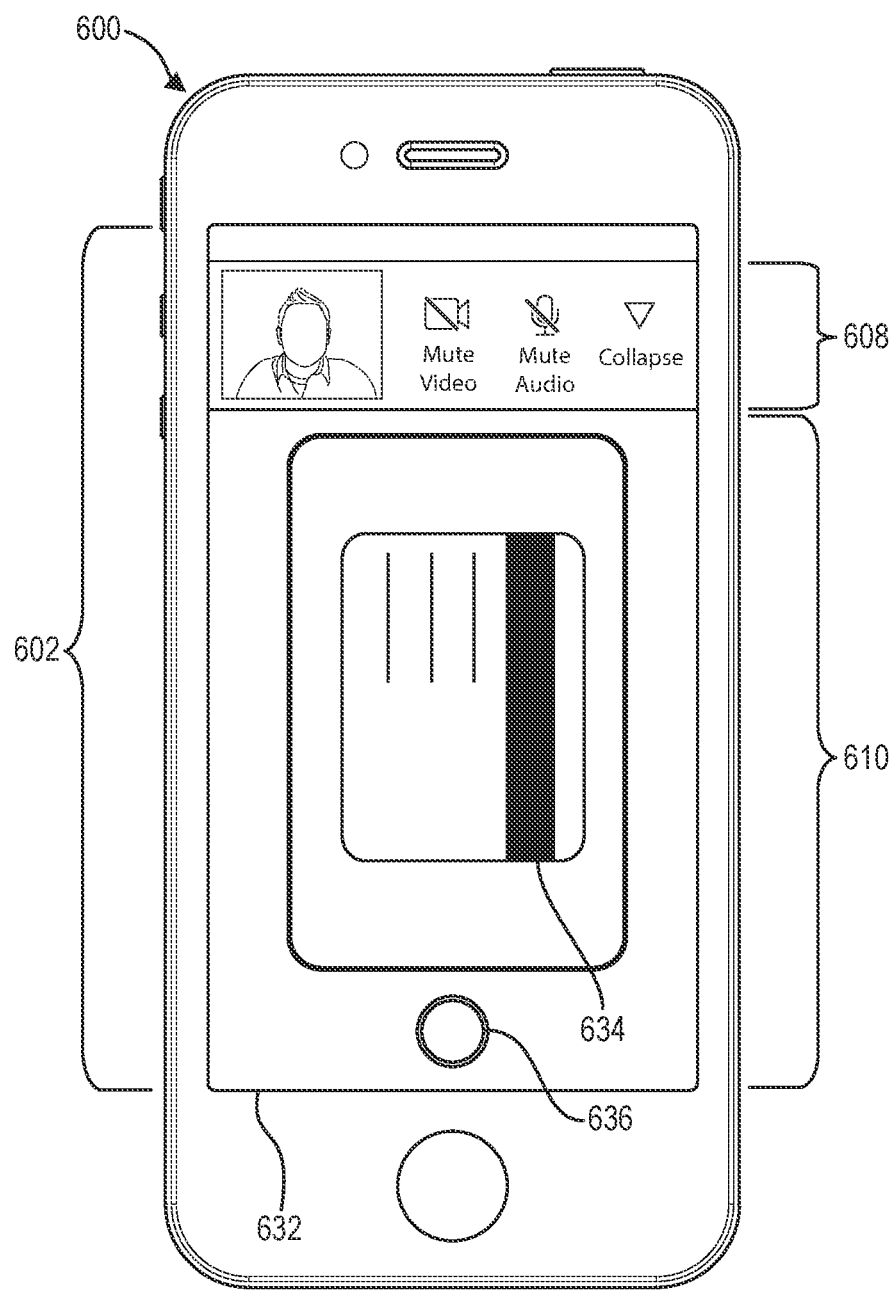
Figure 6D:
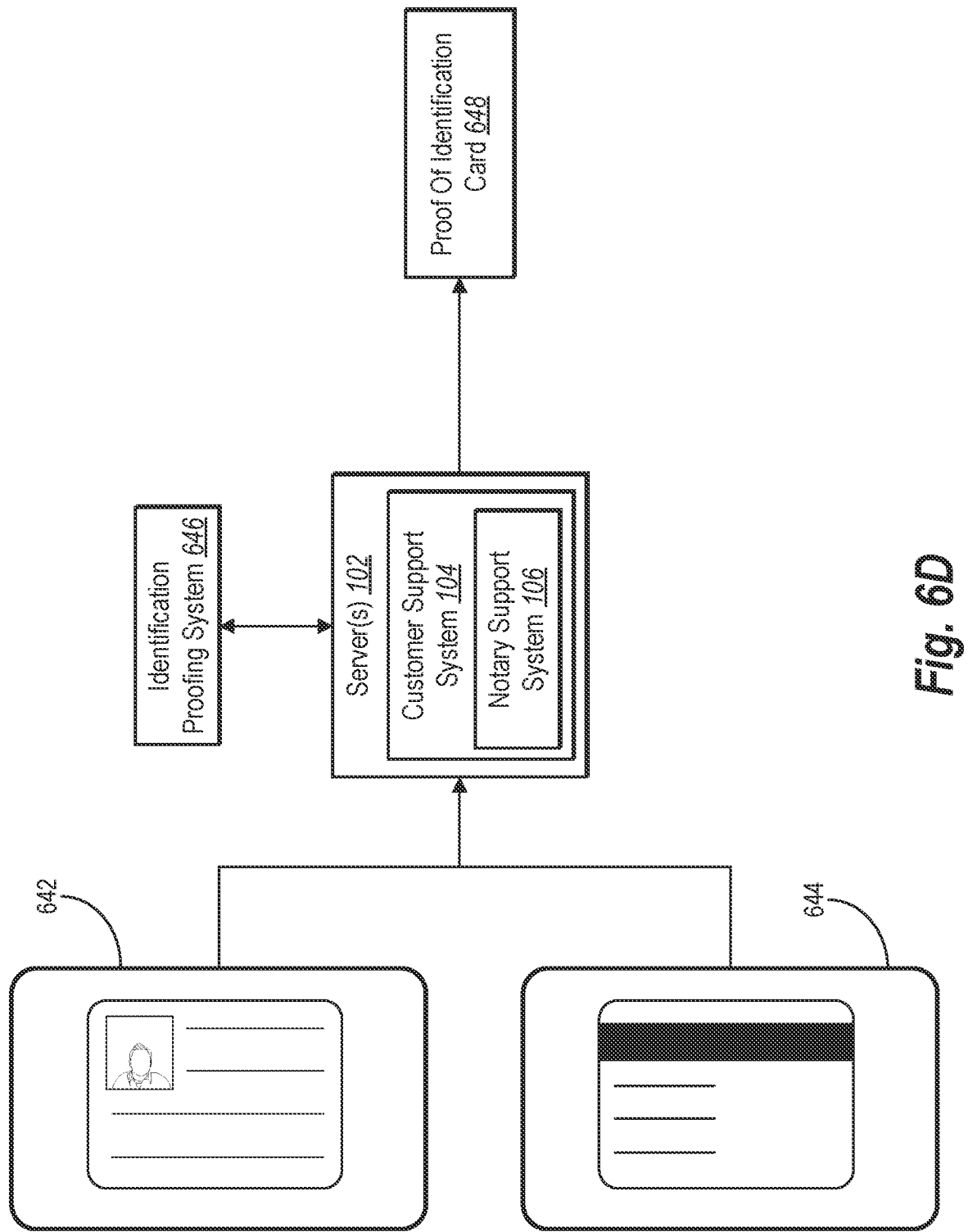
FIG. 6D illustrates a block diagram for utilizing the one or more digital images captured/transmitted using the notarization interfaces of FIGS. 6A-6C to determine a proof of the depicted identification card in accordance with one or more embodiments.

In one or more embodiments, the notary support system 106, as part of the notarization process (e.g., a notary workflow), authenticates the user of a mobile device. In some cases, to authenticate the user, the notary support system prompts the to provide one or more digital images depicting an identification card associated with the user. Accordingly, the notary support system 106 provides one or more notarization interfaces for capturing and/or transmitting one or more digital images of an identification card. FIGS. 6A-6C provide exemplary embodiments of a mobile device displaying a dual pane display in which the mobile device displays one or more notarization interfaces for capturing and/or transmitting digital images of an identification card concurrently with a video chat in accordance with one or more embodiments. FIG. 6D illustrates a block diagram for utilizing the one or more digital images to authenticate the user by determining a proof of the depicted identification card (e.g., determine that the identification card is authentic) in accordance with one or more embodiments.

As illustrated in FIG. 6A, the mobile device 600 provides the dual pane display 602 by dividing the mobile device display screen 606 into a first pane 608 and a second pane 610 (in alternative embodiments, there may be more than two panes). As illustrated, the mobile device 600 provides the video chat in the first pane 608 and a notarization interface 604 in the second pane 610. Alternatively, the mobile device 600 may divide the display screen 606 into three or more panes in response to multiple notarization triggers simultaneously or in response to receiving a notarization trigger corresponding to a notarization interface formatted to use multiple panes.

In one or more embodiments, a mobile device user may choose to accept or reject the notarization interface 604 (or any other notarization interface) before it is displayed in the second pane 610. For example, in response to receiving a notarization trigger corresponding to the notarization interface 604, the display screen 606 may divide into a first pane 608 and a second pane 610. A screen may be subsequently provided in the second pane 610, displaying selectable options to the user of the mobile device 600 to either accept or reject the notarization interface 604. The notarization interface 604 will display in the second pane 610 only when the user selects to accept it. Otherwise, if the user chooses to reject the notarization interface 604, the first pane 608 and the second pane 610 may converge back into a single display (such as that shown in FIG. 5). It should be noted that a mobile device can operate similarly for any notarization interface having a corresponding notarization trigger sent to the mobile device, any notarization interface that is associated with a notary workflow, or any notarization interface that is otherwise provided for display on a mobile device for notarization of a digital document.

Additionally, the mobile device 600 may modify the size of the first pane 608 and the second pane 610 on the display screen 606 or of any other panes based on the size of the notarization interface 604. For example, the notarization interface 604 may require more than half of the display screen 606. As a result, the display screen 606 will divide into a first pane 608 and a second pane 610, wherein the second pane 610 fills the majority of the display space of the display screen 606 and the first pane 608 fills the remaining space available. In one or more embodiments, a mobile device user may modify a notarization interface. Alternatively, a notarization interface may be static and only meant for viewing. In one or more embodiments, providing and modifying a notarization interface may occur independent of any interaction with the video chat provided in the first pane 608.

As mentioned, FIG. 6A illustrates an embodiment of the mobile device 600 displaying a dual pane display 602 in which the mobile device 600 displays a notarization interface 604 concurrently with a video chat. In particular, as shown in FIG. 6A, the notarization interface 604 includes an identification card photo interface. Indeed, the identification card photo interface includes an interface for capturing multiple images of an identification card associated with a user of the mobile device 600. In particular, as shown in FIG. 6A, the identification card photo interface comprises a first button 618 and a second button 620, wherein the first button 618 designates a captured image as a front view of an identification card and the second button 620 designates a captured image as a back view of an identification card. Upon detecting a user selection of the first button 618 or the second button 620, the mobile device 600 overlays the display of the video chat or the display of the identification card photo interface with a viewfinder display, wherein the viewfinder display provides a representation of image data captured by a camera (camera on back of device not shown) of the mobile device 600. Alternatively, when the mobile device 600 receives the notarization trigger that corresponds to the identification card photo interface, it may also receive a camera trigger that immediately activates the camera and overlays the video chat in the first pane 608 or the notarization interface 604 in the second pane 610 with the viewfinder display.

In one or more embodiments, the mobile device 600 is associated with a plurality of cameras. Accordingly, activating a camera of the mobile device 600 can include providing one or more selectable options whereby a user can indicate which camera to use. The mobile device 600 can receive a user interaction (e.g., via the one or more selectable options) selecting a camera from among the plurality of cameras and activate the selected camera accordingly.

In one or more embodiments, while providing the viewfinder display, the video chat may be continuously received by the mobile device 600 (whether or not the mobile device 600 overlays the video chat with the viewfinder display). Alternatively, the visual data from the video chat may temporarily cut off (e.g., where the mobile device 600 overlays the video chat with the viewfinder display) until a user indicates that the capture of the digital images is completed. Additionally, or alternatively, the audio from the video chat transmission is still available while the mobile device user captures the images, so that the notary associated with the notary support terminal may guide the mobile device user through the process.

In one or more embodiments, one or more digital images of the identification card captured by the mobile device 600 via the identification card photo interface are automatically sent to the notary support terminal (or a server, such as the server(s) 102 of FIG. 1) for proofing. Alternatively, in one or more embodiments, the identification card photo interface may include an additional button for sending an image file that has been captured to the satisfaction of the mobile device user. In some embodiments, rather than, or in addition to, sending the digital image(s) of the identification card to the notary support terminal or the server, the mobile device 600 can send the digital images of the notification card to a third-party service (e.g., the third-party system(s) 110 of FIG. 1).

One skilled in the art will appreciate that the notarization interface 604 may function to capture digital images of other documents in addition to identification cards and that FIG. 6A is provided only as an illustration. For example, in one or more embodiments, the notarization interface 604 may enable a user to capture an image of a birth certificate, social security card, or other document that may be required by the notary.

As mentioned above, upon detecting user selection of the first button 618 or the second button 620 displayed within the identification card photo interface, the mobile device 600 can overlay either the first pane 608 or the second pane 610 (or in some embodiments, both panes) of the dual pane display 602 with a viewfinder display. Indeed, in some embodiments, the mobile device 600 displays the viewfinder display within the identification card photo interface displayed in the second pane 610 (i.e., overlays the display providing the first button 618 and the second button 620 with the viewfinder display). In one or more embodiments, the mobile device 600 displays the viewfinder display automatically in response to receiving the notarization trigger. FIGS. 6B-6C illustrate exemplary embodiments of the mobile device 600 providing a viewfinder display.

Referring to FIGS. 6B-6C together, the mobile device 600 displays the viewfinder display 632, which provides a representation of image data captured by a camera of the mobile device 600 (i.e., the camera on the back of the mobile device 600). In particular, in FIG. 6B, the viewfinder display 632 provides a representation of image data corresponding to the front-side of an identification card 634. Similarly, in FIG. 6C, the viewfinder display 632 provides a representation of image data corresponding to the back-side of the identification card 634.

As further shown in FIGS. 6B-6C, the viewfinder display 632 includes an image capture button 636. Upon detecting a user selection of the image capture button 636, the mobile device 600, using the camera, can capture a digital image based on the image data represented within the viewfinder display 632. Indeed, the mobile device 600 can generate a digital image based on the image data. Thus, upon selection of the image capture button 636, the mobile device 600 can capture a front-side digital image of the identification card 634 (shown in FIG. 6B) and/or a back-side digital image of the identification card 634 (shown in FIG. 6C). In one or more embodiments, upon capturing a particular digital image, the mobile device 600 can provide a preview of the captured image. The mobile device 600 can further provide one or more options that allow the user to either accept the captured image or to re-take the digital image.

As mentioned, in one or more embodiments, the mobile device 600 provides the viewfinder display 632 upon selection of a button provided within an identification card photo interface. The mobile device 600 can label or classify a captured image based on the button selected. For example, upon detecting user selection of the first button 618 of FIG. 6A, the mobile device 600 can provide the viewfinder display 632 and designate a digital image captured by the viewfinder display 632 as a front-side digital image of the identification card 634. Similarly, upon detecting user selection of the second button 620 of FIG. 6A, the mobile device 600 can provide the viewfinder display 632 and designate a digital image captured by the viewfinder display 632 as a back-side digital image of the identification card 634.

In some embodiments, however, the mobile device 600 provides the viewfinder display 632 automatically in response to receiving a corresponding notarization trigger. The mobile device 600 can instruct the user to capture the required digital images of the identification card 634 accordingly. For example, in addition to the viewfinder display 632 (or as part of the viewfinder display 632), the mobile device 600 can provide instructions (e.g., a caption) that indicate that the first captured image of the identification card will be designated as a front-side digital image. Upon detecting that a satisfactory front-side digital image of the identification card 634 has been captured, the mobile device 600 can automatically provide additional instructions that indicate that the next captured image of the identification card 634 will be designated as a back-side digital image.

Notably, as shown in FIGS. 6B-6C, a user can use the mobile device 600 to capture digital images of the identification card 634 during the video chat. Indeed, in one or more embodiments, the mobile device 600 continues to provide the video chat conducted between the mobile device 600 and the notary support terminal on the first pane 608 of the dual pane display 602 while the user utilizes the mobile device 600 to capture digital images of the identification card. Thus, a notary associated with the notary support terminal can continue to provide guidance to the user of the mobile device 600, answer any question of the user, etc.

As mentioned, FIG. 6D illustrates a block diagram for utilizing digital images of an identification card to determine a proof of the depicted identification card (e.g., that the identification card corresponds to the user of the mobile device) in accordance with one or more embodiments. As used herein, the term "proof" refers to a verification or confirmation. In particular, a proof can refer to a determination that an identification card is valid and authentic (e.g., not falsified). To illustrate, in some cases, a proof includes a determination of authenticity based on records of the institution (e.g., government) that issued the identification card.

As shown in FIG. 6D, the notary support system 106 receives a front-side digital image 642 and a back-side digital image 644 of an identification card (though, in some embodiments, receiving one digital image is sufficient). The notary support system 106 can utilize the identification proofing system 646 to analyze the front-side digital image 642 and the back-side digital image 644. Based on the analysis, the notary support system 106 can determine a proof 648 of the identification card. For example, in some implementations, the notary support system 106 receives, from the identification proofing system 646, an indication of identification validation based on analysis of the front-side digital image 642 and the back-side digital image 644. The notary support system 106 can determine the proof 648 of the identification card based on the indication of identification validation.

Though FIG. 6D illustrates the notary support system 106 relying on the identification proofing system 646 to determine the proof 648 of the identification card, the notary support system 106 can determine the proof 648 independently in some instances. For example, in some cases, the notary support system 106 can access a database maintained by or otherwise associated with the institution that issued the identification card and confirm that the identification card is authentic.

Though not shown explicitly in FIG. 6D, in one or more embodiments, the notary support system 106 determines the proof 648 of the identification card while maintaining the video connection between the mobile device 600 and the notary support terminal. Indeed, in some implementations, the notary support system 106 continues to provide the video chat for display on the mobile device 600 while determining the proof 648. Accordingly, the user of the mobile device 600 and the notary associated with the notary support terminal can continue to communicate as the proof 648 is determined.

Further, because the video communication is maintained, the notary support system 106 enables the notary to conduct a liveness test while receiving the front-side digital image 642 and the back-side digital image 644 and determining the proof 648 of the identification card. In particular, because the notary can see a video image the user of the mobile device 600 on the video chat displayed on the notary support terminal (rather than seeing a still image and hearing a disembodied voice), the notary can verify that the user of the mobile device 600 is the same person as that depicted in the identification card. In other words, the notary can determine that the user of the mobile device 600 is not fraudulently utilizing someone else's identity. Thus, the notary support system 106 can facilitate authentication of the user of the mobile device by verifying that the user is indeed associated with a provided identification card and by further verifying that the identification card is authentic.

In some instances, rather than providing the identification card photo interface and/or the viewfinder displays directly to the mobile device 600, the notary support system 106 provides a link to the mobile device 600. Upon selection of the link, the mobile device 600 can display notarization interfaces for capturing and/or transmitting digital images of the identification card.

Figure 7A:
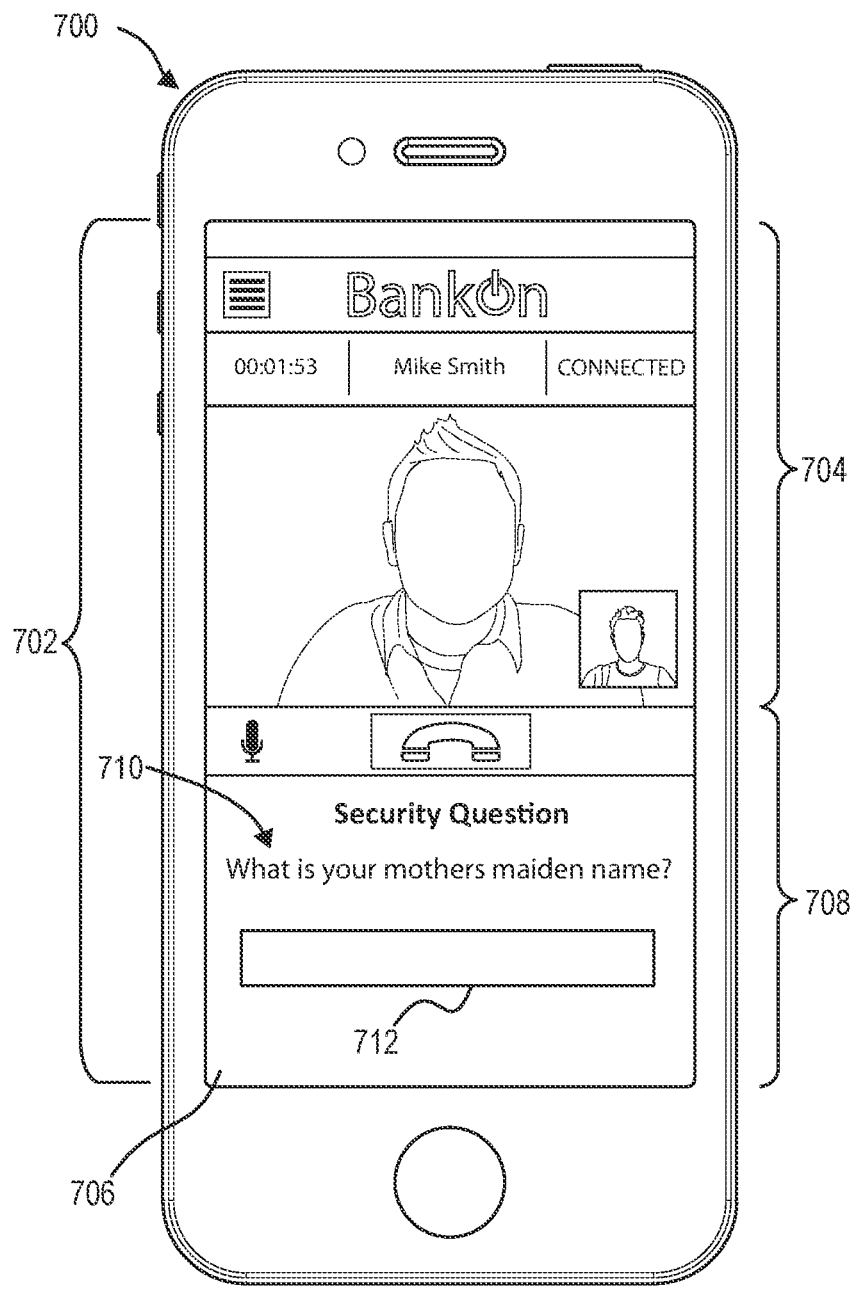
FIG. 7A illustrates a mobile device displaying a dual pane display in which the mobile device displays a notarization interface for presenting knowledge-based authentication security questions in accordance with one or more embodiments.
Figure 7B:
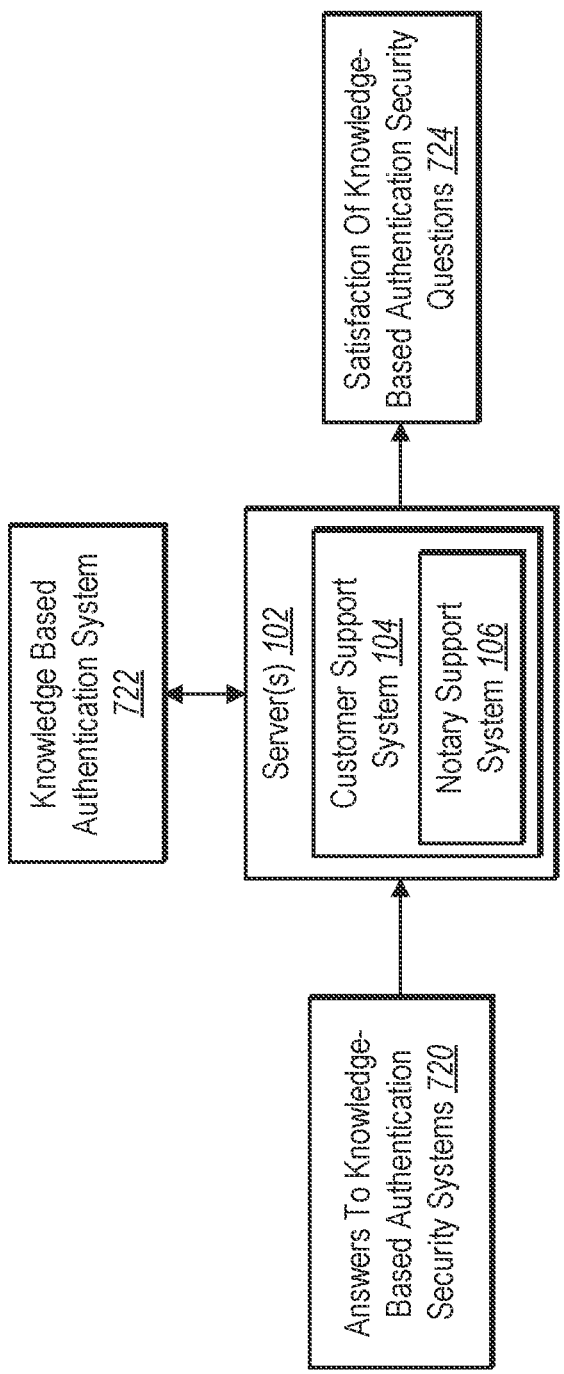
FIG. 7B illustrates a block diagram for utilizing answers to the knowledge-based authentication security questions to authenticate in accordance with one or more embodiments.

In one or more embodiments, the notary support system 106 further authenticates the user of a mobile device via knowledge-based authentication. Accordingly, the notary support system 106 can provides one or more notarization interfaces that facilitate the knowledge-based authentication. In particular, the notary support system 106 can provide one or more notarization interfaces that present knowledge-based authentication security questions. The notary support system 106 can utilize answers to the knowledge-based security questions in authenticating the user of the mobile device. FIG. 7A illustrates a mobile device displaying a dual pane display in which the mobile device displays a notarization interface for presenting knowledge-based authentication security questions in accordance with one or more embodiments. FIG. 7B illustrates a block diagram for utilizing answers to the knowledge-based authentication security questions to authenticate in accordance with one or more embodiments. It should be understood that, while FIGS. 7A-7B provide one exemplary implementation of knowledge-based authentication, the notary support system 106 can adjust the implementation to adhere to the requirements of the government that commissioned the notary.

In particular, FIG. 7A illustrates the mobile device 700 providing the dual pane display 702. The mobile device 700 displays the video chat within a first pane 704 and concurrently displays a notarization interface 706 within a second pane 708. As shown in FIG. 7A, the notarization interface 706 includes a knowledge-based authentication interface. As further shown, the knowledge-based authentication interface includes a knowledge-based authentication security question 710. The knowledge-based authentication security question 710 can include one of various questions deemed sufficient for authenticating a user of the mobile device 700.

In some embodiments, the notary support system 106 determines the knowledge-based authentication security question to present, via the knowledge-based authentication interface, based on a set of knowledge-based security questions previously selected by the user of the mobile device 700 (e.g., the identity purported by the user of the mobile device 700). As one example, before establishing communications with the notary, the user of the mobile device 700 can set up an account with the financial institution associated with the notary support system 106 or with some third-party knowledge-based authentication system. While setting up the account, the user of the mobile device 700 can select a set of relevant knowledge-based authentication security questions and provide the corresponding answers. Thus, the notary support system 106 can select the knowledge-based authentication security question 710 from the pre-established set.

In some instances, however, the notary support system 106 selects the knowledge-based authentication security question to present based on information that is readily accessible to the notary support system. For example, if the user of the mobile device 700 has an account (e.g., a savings account) with the financial institution associated with the notary support system 106, the notary support system 106 can select a knowledge-based authentication security question based on information provided when opening the account.

Further, the knowledge-based authentication interface includes an answer field 712 for providing an answer to the knowledge-based security question. The answer field can include a blank field for text-based input. For example, upon detecting a user selection of the answer field 712, the mobile device 700 can display a keyboard for inputting text to answer the knowledge-based authentication security question 710. In some embodiments, the mobile device 700 displays a drop-down menu or other form of multiple-choice selection in response to detecting a user selection of the answer field 712.

Although FIG. 7A illustrates a single knowledge-based authentication security question and a single answer field within the knowledge-based authentication interface, the notary support system 106 can provide multiple knowledge-based authentication security questions and multiple answer fields within a knowledge-based authentication interface in some implementations. Indeed, in some cases, the notary support system 106 authenticates a user of the mobile device 700 based on answers to a plurality of knowledge-based authentication security questions.

In some implementations, the notary support system 106 provides a plurality of knowledge-based authentication interfaces for display on the mobile device 700. For example, the notary support system 106 can provide a sequence of knowledge-based authentication interfaces, each with one or more knowledge-based authentication security questions. Upon receiving an answer to the knowledge-based authentication security question(s) presented via one knowledge-based authentication interface, the notary support system 106 can automatically provide the next knowledge-based authentication interface in the sequence. In some implementations, the notary support system 106 provides a notarization trigger in conjunction with each knowledge-based authentication interface. In some cases, the notary support system 106 further enables the user of the mobile device 700 to accept or reject each knowledge-based authentication interface.

In one or more embodiments, rather than providing a knowledge-based authentication security question for direct presentation via knowledge-based authentication interface, the notary support system 106 provides a link within the knowledge-based authentication interface. Upon detecting a selection of the link by the user of the mobile device 700, the notary support system can provide a knowledge-based security question. For example, the notary support system 106 can provide a website within the knowledge-based authentication interface, the website displaying the knowledge-based authentication security question. The user of the mobile device 700 can then provide the answer through the website. In some implementations, the notary support system 106 utilizes a third-party site for presenting knowledge-based authentication security questions and provides the link to enable access to the third-party site.

FIG. 7B illustrates the notary support system 106 receiving answers 720 to knowledge-based authentication security questions presented via one or more knowledge-based authentication interfaces, such as the knowledge-based authentication interface shown in FIG. 7A. As further shown, the notary support system 106 utilizes the knowledge-based authentication system 722 to analyze the answers 720. Based on the analysis, the notary support system 106 can determine a satisfaction 724 of the knowledge-based authentication security questions. For example, in some implementations, the notary support system 106 receives, from the knowledge-based authentication system 722, an indication of satisfaction of the one or more knowledge-based authentication security questions presented via one or more knowledge-based authentication interfaces. In some instances, the knowledge-based authentication system 722 generates the indication based on determining that the answers provided by the user of the mobile device 700 are validated/verified by information stored in association with the user. The notary support system 106 can determine the satisfaction of the knowledge-based authentication security questions based on the received indication.

Though FIG. 7B illustrates reliance on the knowledge-based authentication system 722 for determining the satisfaction 724 of the knowledge-based authentication security questions, the notary support system 106 can determine the satisfaction 724 independently in some instances. For example, as suggested above, the notary support system 106 can store information associated with the user of the mobile device 700 (e.g., information provided when the user was opening an account with an institution associated with the notary support system 106). Accordingly, the notary support system 106 can select knowledge-based authentication security questions that correspond to the stored information and confirm the answers by accessing the stored information.

In one or more embodiments, the notary support system 106 determines the satisfaction 724 of the knowledge-based authentication security questions while maintaining the video connection between the mobile device 700 and the notary support terminal. Indeed, in some implementations, the notary support system 106 continues to provide the video chat for display on the mobile device 700 while determining whether the knowledge-based authentication security questions are satisfied. Accordingly, the user of the mobile device 700 and the notary associated with the notary support terminal can continue to communicate as the satisfaction 724 is determined.

Accordingly, in one or more embodiments, the notary support system 106 implements a two-step process for authenticating a user of a mobile device. In particular, the notary support system 106 determines an authenticity of the user based on one or more digital images of an identification card associated with the user (e.g., including the proof of the identification card and the liveness test) and answers to one or more knowledge-based authentication security questions. It should be understood, however, that the notary support system 106 implements fewer or additional steps for authenticating a user of a mobile device in some instances. Additionally, in some implementations, the notary support system 106 waits for verification/confirmation from the notary (e.g., via the notary support terminal) before proceeding with the notarization process.

Figure 8B:
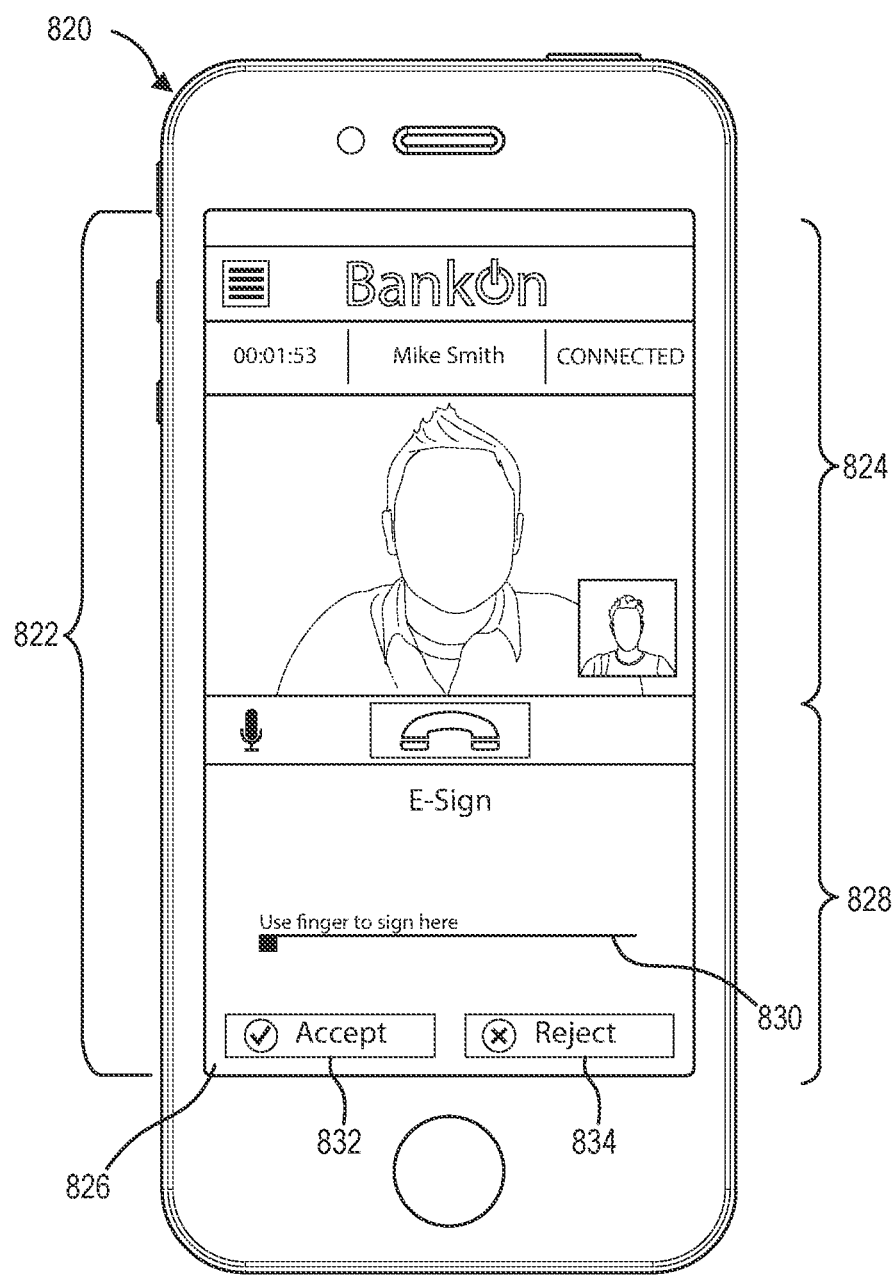
Figure 8C:
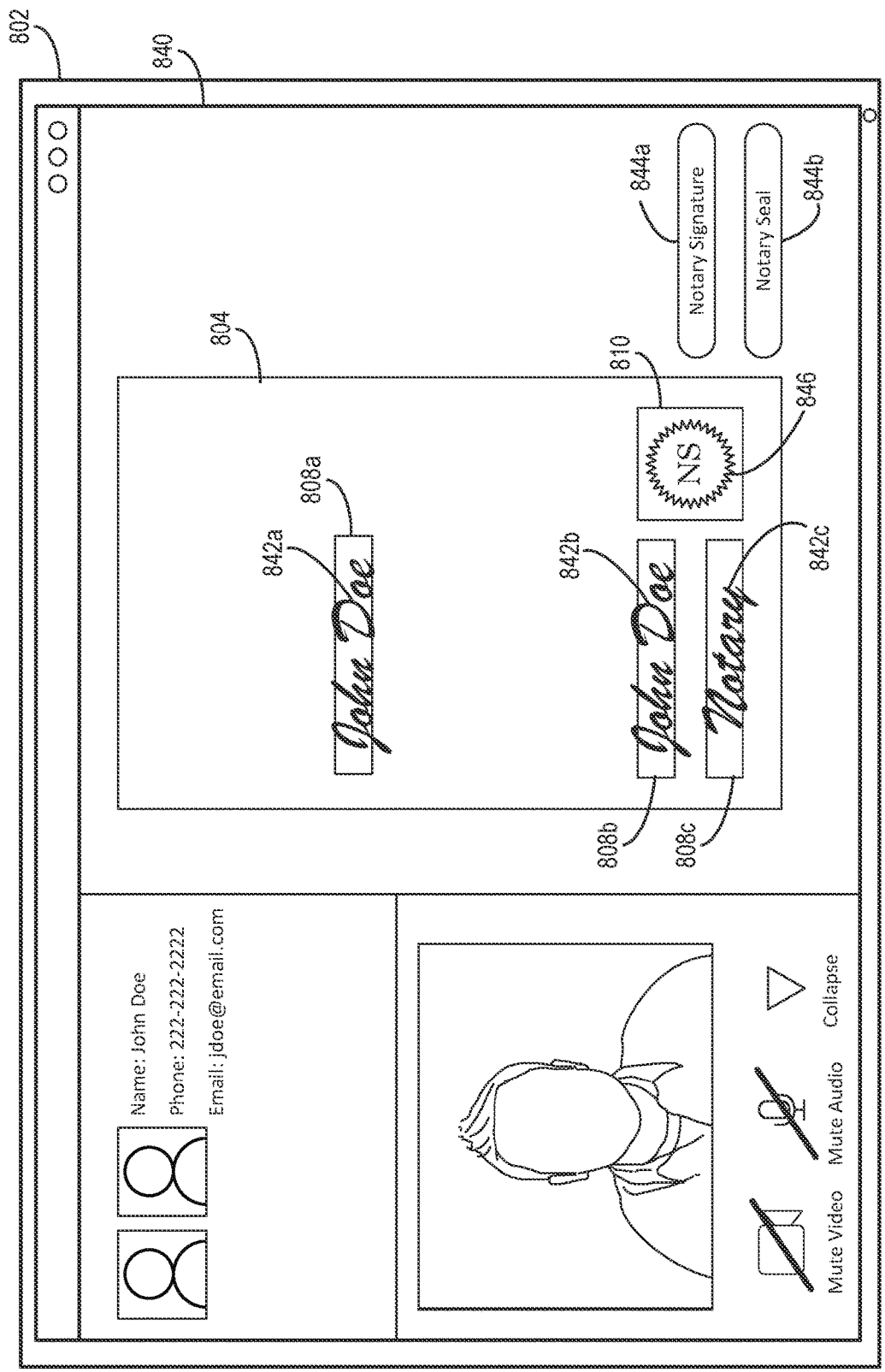

As discussed above, as part of the notarization process, the notary support system 106 further generates one or more digital signatures for the digital document to be notarized. Further, the notary support system 106 applies an electronic notary seal to the digital document. FIGS. 8A-8C illustrate user interfaces used by the notary support system 106 for generating digital signatures and applying an electronic notary seal to a digital document in accordance with one or more embodiments.

For example, FIG. 8A illustrates a user interface 800 used by the notary support system 106 for mapping digital fields for the collection of one or more digital signatures and an electronic notary seal in accordance with one or more embodiments. In particular, FIG. 8A illustrates the user interface 800 displayed on a notary support terminal 802. Further as shown, the notary support system 106 displays, through the user interface 800, a digital document 804. The digital document 804 includes a digital document to be notarized. As mentioned above, the digital document 804 can be provided the mobile device of the user seeking to notarize the digital document 804 or by the notary support terminal 802. In some instances, the notary support system 106 retrieves the digital document 804 from a database.

As further shown in FIG. 8A, the notary support system 106 provides selectable options 806a-806b within the user interface 800. In particular, the selectable option 806a corresponds to mapping digital signature fields to locations of the digital document 804 (e.g., generating digital signature fields for the locations of the digital document 804). For instance, as shown in FIG. 8A, the digital document 804 includes the digital signature fields 808a-808c. In one or more embodiments, the notary support system 106 generates the digital signature fields 808a-808c based on detecting a user selection of the selectable option 806a and then detecting one or more user interactions with the digital document 804 (e.g., user interactions identifying locations of the digital document 804 for the digital signature fields 808a-808c). The digital signature fields 808a-808c can include digital fields configured for a digital signature from a mobile device user or a digital signature from a notary (e.g., a digital notary signature). In some implementations, however, the notary support system 106 provides distinct selectable options for separately mapping digital signature fields for the digital signature of a mobile device user and the digital signature of a notary. In some cases, the notary support system 106 provides a single selectable option (e.g., the selectable option 806a) and enables the notary support terminal 802 to further determine whether a digital signature field is designated for the mobile device user or the notary (e.g., via additional user interactions).

Similarly, the selectable option 806b corresponds to mapping one or more electronic notary seal fields to locations of the digital document 804 (e.g., generating the one or more electronic notary seal fields for the location(s) of the digital document 804). For instance, as shown in FIG. 8A, the digital document 804 includes the electronic notary seal field 810. In one or more embodiments, the notary support system 106 generates the electronic notary seal field 810 based on detecting a user selection of the selectable option 806b and then detecting one or more user interactions with the digital document 804 (e.g., user interactions identifying locations of the digital document 804 for the electronic notary seal field 810).

Thus, the notary support system 106 enables the notary associated with the notary support terminal 802 to prepare the digital document 804 for notarization. Indeed, as suggested by FIG. 8A, the notary support system 106 enables the notary to prepare the digital document 804 before the video chat with the mobile device user. In some instances, however, the notary prepares the digital document 804 during the video chat. For example, while mapping the digital fields to the digital document 804, the notary support system 106 can provide the video chat for display within the user interface 800, allowing the notary and the mobile device user to communicate during preparation of the digital document 804.

FIG. 8B illustrates a dual pane display 822 used by the notary support system 106 for capturing one or more signatures from a user of a mobile device 820. In particular, the notary support system 106 concurrently provides, for display on the mobile device 820, the video chat between a mobile device user and a notary within a first pane 824 and a notarization interface 826 within a second pane 828.

As shown in FIG. 8B, the notarization interface 826 includes a signature pad interface for collecting one or more digital signatures from the user of the mobile device 820. Indeed, as shown in FIG. 8B, the signature pad interface includes a signature line 830, an accept button 832, and a reject button 834. In one or more embodiments, the user of the mobile device 820 enters a signature along the signature line 830. For example, the user of the mobile device 820 can utilize a finger or stylus to write a signature on the signature line 830. The notary support system 106 can provide a preview of the signature for display on the signature line 830 as the user writes the signature or after the user has completed the signature.

Upon detecting a selection of the accept button 832, the notary support system 106 can generate a corresponding digital signature using the signature written on the signature line 830. In some embodiments, the notary support system 106 applies the digital signature to all digital signature fields that have been generated for a digital document and designated for the user of the mobile device 820. In some implementations, however, the notary support system 106 requires a separate digital signature for each digital signature field designated for the mobile device user. For example, in response to detecting a selection of the accept button 832, the notary support system 106 can generate a digital signature using the accepted signature and apply the digital signature to a corresponding digital signature field on the digital document. The notary support system 106 can further provide an additional signature pad interface (or refresh the original signature pad interface) to allow for entry of another signature by the user of the mobile device 820. In such implementations, the notary support system 106 can further provide, for display within the signature pad interface, the portion of the digital document to which the digital signature is to be applied so that the user of the mobile device 820 can read the portion of the digital document before signing. Thus, the notary support system 106 can generate digital signatures for all digital signature fields designated for a mobile device user.

Upon detecting a selection of the reject button 834, the notary support system 106 can delete the signature written on the signature line 830 or provide an additional signature pad interface for display within the second pane 828. Thus, the notary support system 106 allows the user of the mobile device 820 to decide the signature to be applied to the digital document. In some embodiments, however, the notary support system 106 automatically generates a digital signature corresponding to a signature written on the signature line 830 (e.g., without allowing the user to accept or reject the signature).

As the notary support system 106 provides the video chat for display in the first pane 824 concurrently with providing the signature pad interface for display in the second pane 828, the notary support system 106 facilitates continued communication throughout the signing process. In particular, the notary support system 106 allows the user of the mobile device 820 to ask questions regarding the portions of the digital document being signed and/or the notary associated with the notary support terminal to explain what the user is agreeing to by signing.

In one or more embodiments, the notary support system 106 captures a digital image of the user of the mobile device 820 as the user inputs the signatures for the digital document. For example, while providing the signature pad interface, the notary support system 106 can transmit a camera trigger to the mobile device 820, causing a camera of the mobile device 820 to capture a still image of the user while inputting a signature. In some instances, the notary support system 106 records the video chat, generates a time record of the video chat, determines a time that the user input the signature, and then generate a freeze-frame from the recorded video chat at the time that the user input the signature. In some implementations, the notary support system 106 captures a digital image of the user for each signature provided.

In some instances, the notary support system 106 monitors an emotional state of the user of the mobile device 820 while the user is providing the signatures (or any other time during the video chat). For example, the notary support system 106 can utilize the audio and/or video data transmitted during the video chat to monitor the emotional state. In some instances, the notary support system 106 can utilize other resources available via the mobile device 820, such as a health monitoring application installed on the mobile device 820 to obtain data regarding the emotional state of the user. Using the available data, the notary support system 106 can determine whether the user is associated with a state of duress. Based on determining that the user is associated with a state of duress, the notary support system 106 can provide a notification regarding the state of duress to the notary support terminal. In some implementations, the notary support system 106 can further provide a prompt via the notary support terminal, prompting the notary to ask one or more questions to the user of the mobile device 820 to ensure that the user is not providing a signature under duress. In some implementations, the notary support system 106 prevents the user of the mobile device 820 from providing a signature (e.g., by freezing the signature pad interface) until the notary provides input indicating that the notarization process can proceed.

In some instances, rather than monitoring the emotional state of the user itself, the notary support system 106 relies on the notary to monitor the emotional state of the user. For example, the notary can view the user via the video chat and watch for signs indicating that the user may be providing a signature under duress. In some instances, the notary support system 106 prevents the user from providing a signature until it has received input from the notary indicating that the user is not under duress or otherwise has an acceptable emotional state. In some implementations, the notary support system 106 enables the user to provide the signature but provides, to the notary support terminal, a selectable option to pause the process if duress is suspected. In some cases, the notary support system 106 provides, for display on the notary support terminal, instructions for monitoring the user for signs of duress as the user provides the signature.

FIG. 8C illustrates a user interface 840 used by the notary support system 106 for capturing one or more signatures from a notary associated with the notary support terminal 802. Further, the notary support system 106 can use the user interface 840 to apply an electronic notary seal. As illustrated by FIG. 8C, the user interface 840 is displayed on the notary support terminal 802.

As further shown by FIG. 8C, the notary support system 106 provides the digital document 804 for display within the user interface 840. As illustrated, the notary support system 106 has already generated digital signatures 842a-842b for the mobile device user (e.g., based on signatures written on the signature line 830 of the signature pad interface discussed with reference to FIG. 8B). In particular, the notary support system 106 generated the digital signatures 842a-842b within the digital signature fields 808a-808b. Thus, in some embodiments, the notary support system 106 provides the user interface 840 for display on the notary support terminal 802 after having generated digital signatures for the mobile device user. In some implementations, however, the notary support system 106 provides the user interface 840 for display on the notary support terminal 802 before generating the digital signatures (or collecting the corresponding signatures) for the mobile device user. In other words, the notary support system 106 can collect signatures from the mobile device user and the notary in differing orders.

Additionally, as shown in FIG. 8C, the notary support system 106 provides selectable options 844a-844b for display in the user interface 840. The selectable option 844a corresponds to generating a digital signature for the notary associated with the notary support terminal 802. For example, in some implementations, upon detecting a selection of the selectable option 844a, the notary support system 106 provides a tool (e.g., a digital stylus) by which the notary can write a signature via the notary support terminal 802. In some cases, the notary support system 106 further provides a signature line for display within the user interface 840 and prompts the notary to write the signature on the signature line. In some cases, the notary support system 106 highlights the digital signature field in which the notary is to write the signature (e.g., the digital signature field 808c). In some instances, the notary support system 106 provides an enlarged field within the user interface 840 to allow the notary to comfortably write a signature.

As shown in FIG. 8C, the notary support system 106 can generate a digital signature 842c (e.g., a digital notary signature) based on the signature provided by the notary via the user interface 840. Though FIG. 8C illustrates a single digital signature generated for the notary, the notary support system 106 can generate multiple digital signatures for the notary in some embodiments. Further, as discussed above with reference to FIG. 8B, the notary support system 106 can utilize a single signature provided by the notary to generate a digital signature for every digital signature field of a digital document designated for the notary, or the notary support system 106 can prompt the notary to write a signature for each digital signature field.

As further shown in FIG. 8C, the selectable option 844b corresponds to applying an electronic notary seal 846 to the digital document 804. In some implementations, upon detecting a selection of the selectable option 844b, the notary support system 106 provides a tool (e.g., a seal indicator tool) for use by the notary. Based on interactions with the tool, the notary support system 106 can determine a location of the digital document 804—such as an electronic notary seal field (e.g., the electronic notary seal field 810)—at which to apply the electronic notary seal 846. Though FIG. 8C illustrates a single application of the electronic notary seal 846, the notary support system 106 can apply an electronic notary seal to a digital document multiple times in some implementations.

Additionally, as shown in FIG. 8C, the notary support system 106 can provide various other elements for display in the user interface 840. For example, as shown, the notary support system 106 provides the video chat for display within the user interface 840. Accordingly, the notary and the mobile device user can continue to communicate while the notary inputs the signature(s) and electronic notary seal. Further, as shown, the notary support system 106 provides information relevant to the video chat (e.g., the name, phone number, and email address of the mobile device user).

Thus, the notary support system 106 flexibly expands the functionality offered by software applications by facilitating remote notarization of a digital document. Indeed, the notary support system 106 provides functionality—unavailable in conventional software applications that allow a notary to authenticate a mobile device user, monitor the mobile device user signing the digital document, and apply a notary signature and seal to the digital document during a concurrent video communication despite being remotely located from the mobile device user.

Further, the notary support system 106 operates more efficiently than conventional software applications. For example, by enabling a notary to use a notary support terminal to push notarization interfaces to a mobile device, the notary support system 106 relieves the mobile device user of the burden of navigating the software application, freeing up computing resources that would have otherwise been tied up due to misguided navigation. Further, by providing the video chat in one of multiple panes displayed on the mobile device and providing notarization interfaces in another pane, the notary support system 106 avoids necessitating the use of multiple devices or multiple applications to communicate with a notary while notarizing a digital document, reducing the computing resources consumed in the process.

Figure 9:
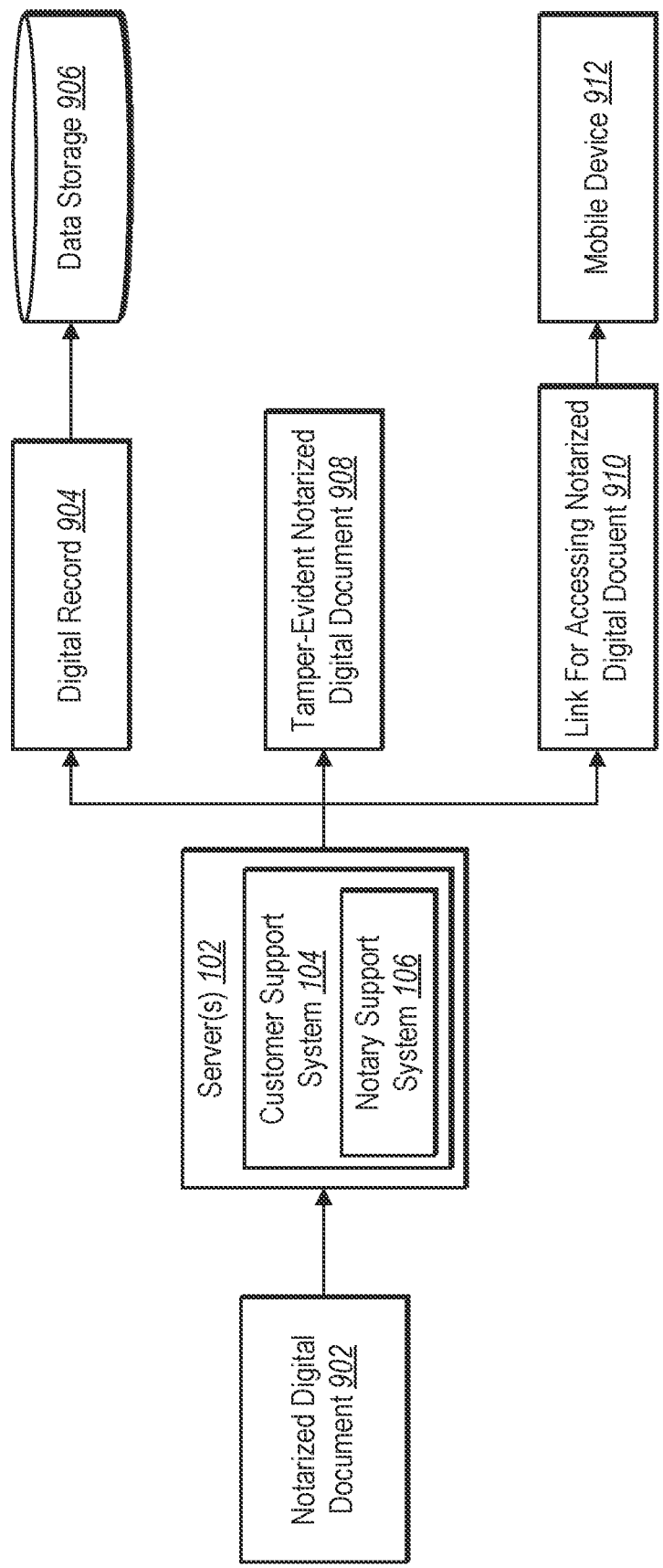
FIG. 9 illustrates a block diagram for finalizing the notarization process in accordance with one or more embodiments.

In one or more embodiments, after notarization of a digital document, the notary support system 106 finalizes the notarization process. FIG. 9 illustrates a block diagram for finalizing the notarization process in accordance with one or more embodiments. As shown in FIG. 9, the notary support system 106 obtains the notarized digital document 902. In particular, the notary support system 106 obtains the notarized digital document 902 during the video chat by authenticating the mobile device user, generating digital signatures based on signatures collected from the mobile device user and the notary, and applying an electronic seal to the digital document.

As further shown in FIG. 9, the notary support system 106 generates a digital record 904 corresponding to the notarized digital document 902. In one or more embodiments, the notary support system 106 generates the digital record 904 to include digital data corresponding to the notarization process, such as the name of the mobile device user, date and/or time that the notarization took place, the type of digital document notarized, and/or any notes from the notary. It will be understood, however, that the notary support system 106 can include any relevant data within the digital record 904.

As further shown in FIG. 9, the notary support system 106 stores the digital record 904 in data storage 906. In one or more embodiments, the notary support system 106 stores the digital record 904 in association with then notary. For example, in some instances, data storage 906 maintains an electronic journal associated with the notary (e.g., an electronic journal that stores digital data regarding notarization processes within which the notary participated). Accordingly, then notary support system 106 can store the digital record 904 as a record of the notarization process between the notary and the mobile device user.

Additionally, as shown in FIG. 9, the notary support system 106 renders the notarized digital document 902 tamper-evident (as shown by the box 908). In one or more embodiments, the notary support system 106 utilizes a third-party system to render the notarized digital document 902 tamper-evident. For example, the notary support system 106 provides the notarized digital document 902 to the third-party system and receives a modified version of the notarized digital document 902 that is tamper-evident. In some implementations, the notary support system 106 stores the tamper-evident version of the notarized digital document 902 within storage as a record of the notarization.

As further shown in FIG. 9, the notary support system 106 generates a link 910 for accessing the notarized digital document 902. Further, the notary support system 106 provides the link to the mobile device 912 (e.g., a mobile device associated with the user that participated in the notarization process). For example, in some instances, the notary support system 106 sends the link 910 to an email account associated with the mobile device 912 (e.g., associated with the user of the mobile device 912). In some embodiments, the notary support system 106 sends the link to the mobile device 912 via text message or using a messaging application associated with a social networking system with which the user is registered. Upon selection of the link 910, the notary support system 106 can further provide information related to the notarization, such as the name of the notary, the commission identification number of the notary, and the commissioning state. For example, in some cases, the notary support system 106 adds this information to the copy of the notarized digital document 902 that is provided upon selection of the link.

Figure 10:
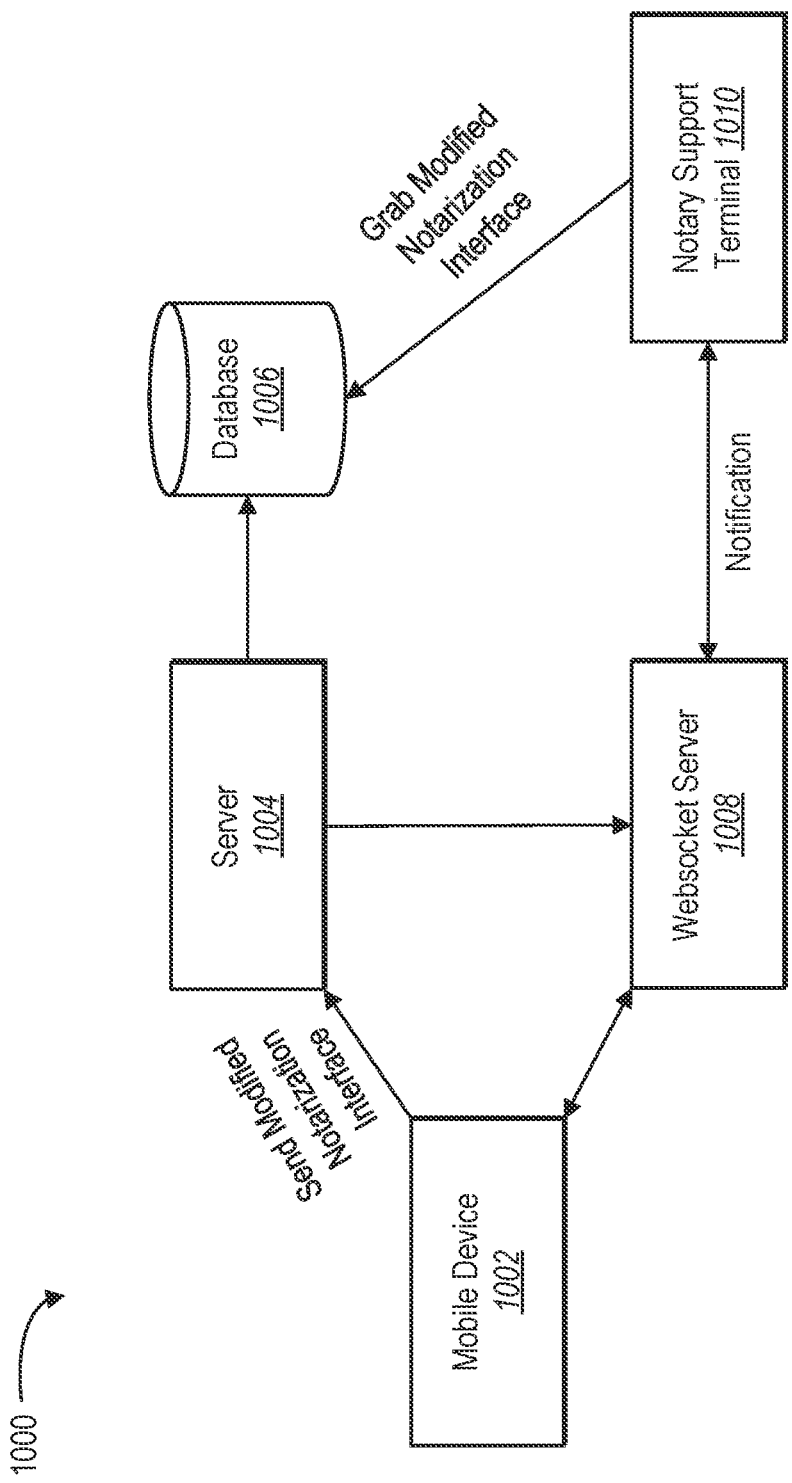
FIG. 10 illustrates an example implementation of a system used to send a modified notarization interface to a notary support terminal in accordance with one or more embodiments.

As suggested above, a mobile device user participating in a notarization process can interact with or provide input via a notarization interface. In some implementations, the user interactions/input modifies the notarization interface. Accordingly, the mobile device of the user transmits a modified notarization interface for access by the notary support terminal. FIG. 10 illustrates an example implementation of a system 1000 used to send a modified notarization interface to a notary support terminal in accordance with one or more embodiments. In one or more embodiments, the system 1000 comprises components used in the environment 100 of FIG. 1 and the environment 100 can perform the same operations as the system 1000. In other words, the notary support system 106 operates within the environment 100 to implement the system 1000. As illustrated in FIG. 10 the system 1000 comprises a mobile device 1002, a server 1004, a database repository 1006, a Web Socket server 1008, and a notary support terminal 1010.

The system 1000 establishes a connection between the mobile device 1002 and the database repository 1006 through the server 1004. In one or more embodiments, the connection is a third connection different from a first connection used to establish a video chat between the mobile device 1002 and the notary supporter terminal 1010 and different from a second connection used to enable the notary support terminal 1010 to push notarization interfaces to the mobile device 1002. The server 1004 enables the mobile device 1002 to securely transmit a modified notarization interface to the database repository 1006. As illustrated in FIG. 10, the server 1004 is a single server. Alternatively, the third connection may be made through a series of servers.

After receiving a modified notarization interface, the server 1004 forwards the modified notarization interface to the database repository 1006 and sends a notification to the notary support terminal 1010 through the WebSocket server 1008. In one or more alternative embodiments, the notification may be sent to the notary support terminal 1010 directly from the mobile device 1002. The notification indicates that the database repository 1006 has received the modified notarization interface and provides a location of the modified notarization interface within the database repository 1006 so the notary support terminal 1010 may grab the modified notarization interface. Additionally, or alternatively, the notification may include a link to the location of the modified notarization interface, enabling then notary support terminal 1010 to quickly acquire the modified notarization interface.

The database repository 1006 may comprise a service that allows for the deposit and retrieval of electronic files. For example, the database repository 1006 may be an electronic drop box, email service, or other cloud-based technology that allows electronic file sharing.

Though not explicitly illustrated in FIG. 10, one or more embodiments use the system 1000 to provide notifications and notarization interfaces to the mobile device 1002. For example, the server 1004 can send a notification of a task to the mobile device 1002 (e.g., through the Web Socket server 1008). If the user indicates acceptance of the task indicated by the notification, the server 1004 can then retrieve the notarization interface that corresponds to the task from the database repository 1006 and provide the notarization interface to the mobile device 1002.

As shown by FIG. 10, the system 1000 can utilize cloud hosting (i.e., the database can comprise one or more cloud-based servers). This type of cloud hosting allows for flexibility and scalability. New instances of servers can be created quickly and efficiently to ensure the system scales the use of the application as adoption rates increase. Thus, embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
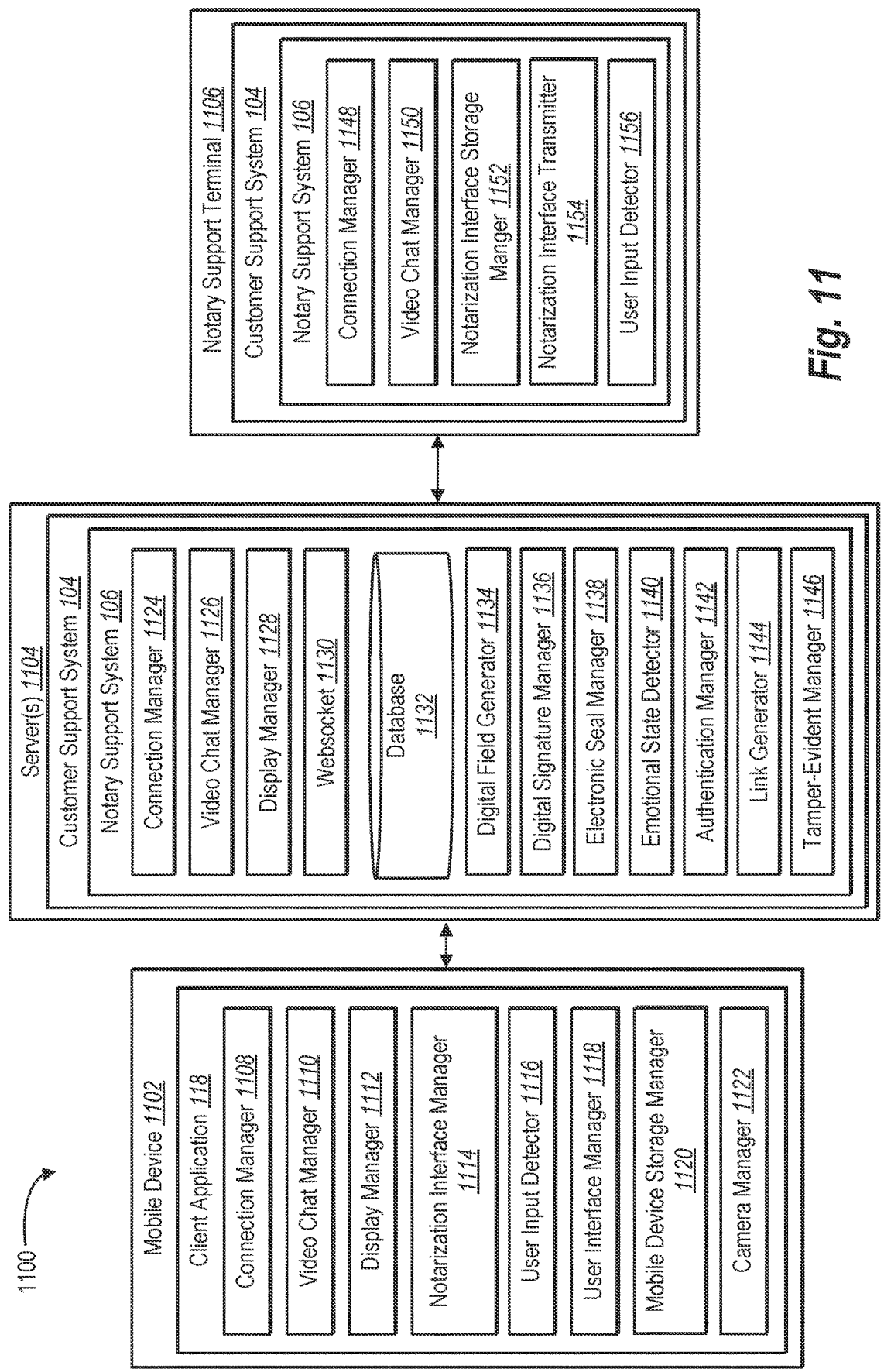
FIG. 11 illustrates a schematic diagram of a notary support system in accordance with one or more embodiments.

Turning now to FIG. 11, additional detail will be provided regarding components and capabilities of one embodiment of the disclosed systems comprising the environment 100 as well as the system 1000. In particular, FIG. 11 illustrates an embodiment of an exemplary system 1100. As shown, the system 1100 may include, but is not limited to, a mobile device 1102, a server(s) 1104, and a notary support terminal 1106. Moreover, as shown, the mobile device 1102 includes, but is not limited to, a connection manager 1108, a video chat manager 1110, a display manager 1112, a notarization interface manager 1114, a user input detector 1116, a user interface manager 1118, a mobile device storage manager 1120, and a camera manager 1122. Additionally, as shown in FIG. 11, the server(s) 1104 includes, but is not limited to, a connection manager 1124, a video chat manager 1126, display manager 1128, a Websocket 1130, a database 1132, a digital field generator 1134, a digital signature manager 1136, an electronic seal manager 1138, an emotional state detector 1140, an authentication manager 1142, a link generator 1144, and a tamper-evident manager 1146. Furthermore, as shown in FIG. 11, the notary support terminal 1106 includes, but is not limited to, a connection manager 1148, a video chat manager 1150, a notarization interface storage manager 1152, a notarization interface transmitter 1154, and a user input detector 1156.

As just mentioned, and as illustrated in FIG. 11, the mobile device 1102 includes the connection manager 1108. The connection manager 1108 searches for, detects, identifies, accepts, establishes, monitors, and maintains various types of connections. In particular, the connection manager 1108 establishes and maintains one or more connections between the mobile device 1102 and another device, such as the notary support terminal 1106. For example, when establishing a video chat between the mobile device 1102 and the notary support terminal 1106, the connection manager 1108 will establish and maintain a peer-to-peer connection through the duration of a video chat session.

As mentioned, and as illustrated in FIG. 11, the mobile device 1102 also includes the video chat manager 1110. The video chat manager 1110 initiates, provides for display, and maintains a video chat between the mobile device 1102 and another device, such as the notary support terminal 1106. In particular, the video chat manager 1110 operates in conjunction with the connection manager 1108 to establish and maintain a video chat between the mobile device 1102 and another device, such as the notary support terminal 1106.

Additionally, the video chat manager 1110 operates in conjunction with a number of user input/output devices, including, but not limited to cameras, microphones, display screens, touchscreens, and keypads.

As mentioned, and as illustrated in FIG. 11, the mobile device 1102 also includes the display manager 1112. The display manager 1112 maintains and changes a display presented on the mobile device 1102. In particular, the display manager 1112 works in conjunction with the user input detector 1116 to change a display of the mobile device 1102 in response to detecting a user interaction. Additionally, the display manager 1112 works in conjunction with the user interface manager 1118 to display a graphical user interface.

The display manager 1112 also changes the display of the mobile device 1102 in response to receiving triggering code through a connection to another device. For example, the display manager 1112 may receive triggering code over a connection. In response to receiving the triggering code, the display manager 1112 can divide the display of the mobile device 1102 into multiple panes, enabling the mobile device 1102 to display multiple display items within the multiple panes. As referred to herein, a "display item" refers to a visual component (e.g., character, image, video, or user interface) For example, the mobile device 1102 may be able to display separate mobile applications in the multiple panes or the mobile device may display a video chat in one pane and a notarization interface in another.

Additionally, the display manager 1112 may modify the size of the multiple panes according to the needs of the items displayed within those panes. In particular, the display manager 1112 may increase the size of a pane if the display item within the pane requires more display space.

As mentioned, and as illustrate in FIG. 11, the mobile device 1102 also includes the notarization interface manager 1114. The notarization interface manager 1114 receives, sends, and provides notarization interfaces. In particular, the notarization interface manager 1114 operates in conjunction with the display manager 1112 to display a notarization interface on the mobile device 1102. In one or more embodiments, the notarization interface manager 1114 can render notarization interfaces.

Additionally, the notarization interface manager 1114 modifies and maintains notarization interface. In particular, the notarization interface manager 1114 operates in conjunction with the user input detector 1116 to detect a user input. In response to detecting a user input, the notarization interface manager 1114 modifies the notarization interface in accordance with the particular user interaction.

As mentioned, and as illustrated in FIG. 11, the mobile device 1102 also includes the user input detector 1116. The user input detector 1116 detects, identifies, monitors, receives, processes, captures, and/or records various types of user input. For example, the user input detector 1116 detects one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 1116 operates in conjunction with a number of user input devices (in isolation or in combination), mouse devices, keyboards, track pads, or stylus devices. The user input detector 1116 detects and identifies various types of user interactions with user input devices, such as select events, drag events, scroll events, and so forth. For example, the user input detector 1116 detects one or more touch gestures (e.g., swipe gestures, tap gestures, pinch gestures, or reverse pinch gestures) from a user that forms a user interaction.

The user input detector 1116 communicates with, and thus detects user input with respect to, a variety of programs, applications, plug-ins, operating systems, user interfaces, or other implementations in software or hardware.

As mentioned, and as illustrated in FIG. 11, the mobile device 1102 also includes the user interface manager 1118. The user interface manager 1118 provides, manages, and/or controls a graphical user interface (or simply "user interface") for use with the system 1100. In particular, the user interface manager 1118 can facilitate presentation of information by way of an external component of the mobile device 1102. For example, the user interface manager 1118 can display a user interface by way of a display screen associated with the mobile device 1102. The user interface may be composed of a plurality of graphical components, objects, and/or elements that allow a user to perform a function. The user interface manager 1118 presents, via the mobile device 1102, a variety of types of information, including text, images, video, audio, characters, or other information. Moreover, the user interface manager 1118 provides a variety of user interfaces specific to a variety of functions, programs, applications, plug-ins, devices, operating systems, and/or components of the mobile device 1102.

The user interface manager 1118 can provide a user interface with regard to a variety of operations or applications. For example, the user interface manager 1118 provides a user interface that facilitates selecting, identifying, searching, or downloading digital files. Similarly, the user interface manager 1118 can generate a user interface that facilitates managing, editing, modifying, downloading, uploading, or sending digital images. Additional details with respect to various example user interface elements are described throughout with regard to various embodiments containing user interfaces.

In addition, as illustrated in FIG. 11, the mobile device 1102 also includes the mobile device storage manager 1120. The mobile device storage manager 1120 maintains data for the system 1100. The mobile device storage manager 1120 can maintain data of a type, size, or kind, as necessary to perform the functions of the system 1100.

Additionally, as illustrated in FIG. 11, the mobile device 1102 also includes the camera manager 1122. The camera manager 1122 controls operation of one or more cameras of the mobile device 1102. For example, the camera manager 1122 can activate a camera of the mobile device 1102 and capture images using the camera of the mobile device 1102.

Furthermore, as illustrated in FIG. 11, the server(s) 1104 includes the connection manager 1124. The connection manager 1124 searches for, detects, identifies, accepts, establishes, monitors, and maintains various types of connections. In particular, the connection manager 1124 establishes and maintains one or more connections between devices. For example, the connection manager 1124 may establish a connection between the mobile device 1102 and the notary support terminal 1106.

As mentioned, and as illustrated in FIG. 11, the server(s) 1104 also includes the video chat manager 1126. The video chat manager 1126 establishes, receives, transmits, and maintains a video chat between multiple devices. For example, the video chat manager 1126 may establish and maintain a video chat between the mobile device 1102 and another device, such as the notary support terminal 1106. In particular, the video chat manager 1126 operates in conjunction with the connection manager 1124 to establish and maintain a video chat across a connection maintained by server(s) 1104.

As mentioned, and as illustrated in FIG. 11, the server(s) 1104 also includes the display manager 1128. The display manager 1128 receives and transmits items for display on devices. In particular, the display manager 1128 can transmit items sent from one device to another device. For example, the display manager 1128 can transmit a notarization interface sent from the notary support terminal 1106 to be displayed on the mobile device 1102.

As mentioned, and as illustrated in FIG. 11, the server(s) 1104 also includes the Websocket 1130. The Websocket 1130 is a bidirectional communication module that enables a device acting as a server to push data to a client device (e.g., the mobile device 1102), rather than waiting for the client device to send a request for data, which the server then fills. In particular, the Websocket 1130 operates in conjunction with the display manager 1128 to enable a device acting as a server to push items for display to a device acting as a client. For example, the Websocket 1130 and the display manager 1128 work in conjunction to enable the notary support terminal 1106 to push a notarization interface for display to the mobile device 1102.

As mentioned, and as illustrated in FIG. 11, the server(s) 1104 also includes the database 1132. The database 1132 operates as a database repository to store data for retrieval. The database 1132 can operate as an electronic cloud storage system (e.g., an electronic drop box). In particular, the database 1132 stores data for retrieval from a device. For example, the database 1132 can store a modified notarization interface received from the mobile device 1102 until it is overwritten or retrieved by the notary support terminal 1106.

Additionally, as shown in FIG. 11, the server(s) 1104 include the digital field generator 1134. The digital field generator 1134 can generate digital fields (e.g., digital signature fields and/or electronic notary seal fields) for a digital document. For example, the digital field generator 1134 can generate digital fields for locations of a digital document that have been selected by the notary support terminal 1106.

Further, as shown in FIG. 11, the server(s) 1104 include the digital signature manager 1136. The digital signature manager 1136 can collect signatures and generate corresponding digital signatures for a digital document. For example, the digital signature manager 1136 can collect a signature by accepting user input from the mobile device 1102 or the notary support terminal 1106. The digital signature manager 1136 can generate a corresponding digital signature and place the digital signature within a digital signature field generated for the digital document.

As shown in FIG. 11, the server(s) 1104 also include the electronic seal manager 1138. The electronic seal manager 1138 applies an electronic notary seal to a digital document. For example, the electronic seal manager 1138 can place an electronic notary seal within an electronic notary seal field generated for the digital document (e.g., in response to user input received via the notary support terminal 1106).

As shown in FIG. 11, the server(s) 1104 further include the emotional state detector 1140. The emotional state detector 1140 can monitor an emotional state of a mobile device user. For example, the emotional state detector 1140 can monitor video, audio, or other data to determine whether the mobile device user is in a state of duress. In some embodiments, upon determining that the mobile device user is in a state of duress, the emotional state detector 1140 can provide a notification to the notary support terminal 1106. In some instances, as discussed above, the notary associated with the notary support terminal 1106 can visually monitor the user of the mobile device 1102 via the video chat. Accordingly, in some cases, the emotional state detector 1140 can provide selectable options to the notary support terminal 1106 that, if selected, indicate that the user is in a state of duress.

Additionally, as shown in FIG. 11, the server(s) 1104 include the authentication manager 1142. The authentication manager 1142 can facilitate authentication of a user of the mobile device 1102. For example, the authentication manager 1142 can provide, to a third-party system, one or more digital images depicting an identification card associated with the user of the mobile device 1102 or answers to knowledge-based authentication security questions received from the mobile device 1102 to authenticate the user.

Further, as shown in FIG. 11, the server(s) 1104 include the link generator 1144. The link generator 1144 can generate a link for accessing a notarized digital document. In some cases, the link generator 1144 provides the link to the mobile device 1102 (e.g., via an email message, a text message, etc.). Though not explicit, the link generator 1144 can further generate a digital record that includes digital data corresponding to the notarization process and store the digital record in association with the notary associated with the notary support terminal 1106.

As shown in FIG. 11, the server(s) 1104 also include the tamper-evident manager 1146. The tamper-evident manager 1146 can render a notarized digital document tamper-evident. For example, in some implementations, the tamper-evident manager 1146 operates in conjunction with a third-party system for rendering the notarized digital document tamper evident.

Furthermore, as shown in FIG. 11, the notary support terminal 1106 includes the connection manager 1148. The connection manager 1148 searches for, detects, identifies, accepts, establishes, monitors, and maintains various types of connections. In particular, the connection manager 1148 establishes and maintains one or more connections between the notary support terminal 1106 and another device, such as the mobile device 1102. For example, when establishing a video chat between the mobile device 1102 and the notary support terminal 1106, the connection manager 1148 will establish and maintain a peer-to-peer connection through the duration of the video chat session.

As mentioned, and as illustrated in FIG. 11, the notary support terminal 1106 also includes the video chat manager 1150. The video chat manager 1150 initiates, provides for display, and maintains a video chat between the notary support terminal 1106 and another device, such as the mobile device 1102. In particular, the video chat manager 1150 operates in conjunction with the connection manager 1148 to establish and maintain a video chat between the notary support terminal 1106 and another device, such as a mobile device 1102.

Additionally, the video chat manager 1150 operates in conjunction with any number of user input/output devices, including, but not limited to cameras, microphones, display screens, touchscreens, and keypads.

As mentioned, and as illustrated in FIG. 11, the notary support terminal 1106 also includes the notarization interface storage manager 1152. The notarization interface storage manager 1152 stores notarization triggers (and, possibly, notarization interfaces) that may be selected and transmitted to another device, such as the mobile device 1102. In particular, the notarization interface storage manager 1152 operates in conjunction with the notarization interface transmitter 1154 and the connection manager 1148 to transmit a notarization trigger (and, possibly, a notarization interface) across a connection. As mentioned above, in one or more embodiments, the mobile device 1102 stores the notarization interfaces corresponding to the notarization triggers.

As mentioned, and as illustrated in FIG. 11, the notary support terminal 1106 also includes the notarization interface transmitter 1154. The notarization interface transmitter 1154 operates to transmit a notarization interface across a connection to another device. In some embodiments, the notarization interface transmitter 1154 operates to transmit a notarization trigger across the connection. For example, the notarization interface transmitter 1154 can transmit a notarization trigger in conjunction with the corresponding notarization interface.

Further, as mentioned, and as illustrated in FIG. 11, the notary support terminal 1106 includes the user input detector 1156. The user input detector 1156 detects, identifies, monitors, receives, processes, captures, and/or records various types of user input. For example, the user input detector 1156 detects one or more user interactions with respect to a user interface displayed on the notary support terminal 1106.

Figure 12:
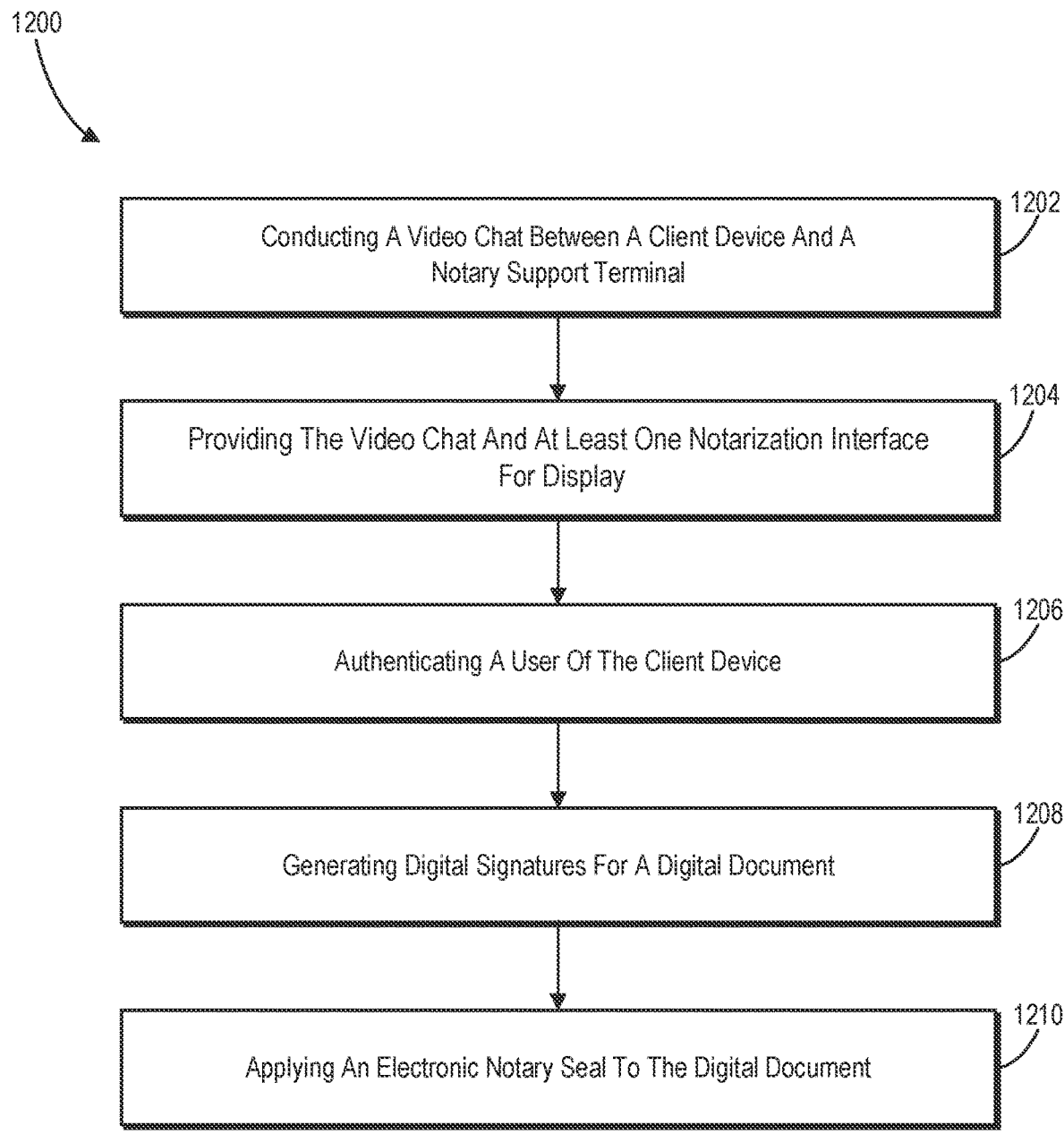
FIG. 12 illustrates a flowchart of a series of acts for notarizing a digital document during a video chat in accordance with one or more embodiments.

Turning now to FIG. 12, this figure illustrates a flowchart of a series of acts 1200 for notarizing a digital document during a video chat in accordance with one or more embodiments. While FIG. 12 illustrates acts according to one embodiment, alternative embodiments may omit, add to, reorder, and/or modify any of the acts shown in FIG. 12. The acts of FIG. 12 can be performed as part of a method. In one or more embodiments, a non-transitory computer-readable medium stores instructions that, when executed by at least one processor, cause a computing device to perform the acts of FIG. 12. In still further embodiments, a system can perform the acts of FIG. 12.

As illustrated in FIG. 12, the series of acts 1200 includes an act 1202 of conducting a video chat between a client device and a notary support terminal. In particular, the act 1202 can involve conducting a video chat for notarizing a digital document between a client device and a notary support terminal. In one or more embodiments, the notary support system 106 receives the digital document to be notarized from the notary support terminal. In some cases, the notary support system 106 receives the digital document from the client device.

As shown in FIG. 12, the series of acts 1200 also includes an act 1204 of providing the video chat and at least one notarization interface for display. In particular, the act 1204 can involve providing, on a display of the client device, the video chat between the client device and the notary support terminal within a first pane and at least one notarization interface for notarizing the digital document in a second pane.

Further, as shown in FIG. 12, the series of acts 1200 includes an act 1206 of authenticating a user of the client device. In particular, the act can involve notarizing the digital document during the video chat by authenticating a user of the client device based on user input received through the at least one notarization interface.

In one or more embodiments, authenticating the user of the client device based on the user input received through the at least one notarization interface comprises: receiving one or more digital images captured via the at least one notarization interface, the one or more digital images depicting an identification card associated with the user of the client device; and determining a proof of the identification card based on the one or more digital images.

In some cases, authenticating the user of the client device based on the user input received through the at least one notarization interface comprises: providing, to the client device, one or more knowledge-based authentication security questions via the at least one notarization interface; receiving one or more answers to the one or more knowledge-based authentication security questions via the at least one notarization interface; and determining an authenticity of the user of the client device based on the one or more answers.

Additionally, as shown in FIG. 12, the series of acts 1200 includes an act 1208 of generating digital signatures for a digital document. In particular, the act 1208 can involve notarizing the digital document during the video chat by further generating one or more digital signatures for the digital document based on one or more user interactions with the at least one notarization interface.

In one or more embodiments, the notary support system 106 further generates one or more digital signature fields for the digital document based on additional user input received from the notary support terminal. Accordingly, in some implementations, generating the one or more digital signatures comprises generating the one or more digital signatures within the one or more digital signature fields.

As illustrated in FIG. 12, the series of acts 1200 further includes an act 1210 of applying an electronic notary seal to the digital document. In particular, the act 1210 can involve notarizing the digital document during the video chat by further applying, to the digital document, an electronic notary seal received from the notary support terminal.

In one or more embodiments, the notary support system 106 further generates one or more electronic notary seal fields for the digital document based on additional user input received from the notary support terminal. Accordingly, in some implementations, applying the electronic notary seal to the digital document comprises applying the electric notary seal within the one or more electronic notary seal fields.

In one or more embodiments, the series of acts 1200 further include acts for finalizing the notarization process. For example, in some instances, the acts include generating a digital record based on notarization of the digital document during the video chat; and storing the digital record in association with a notary associated with the notary support terminal. For example, in some instances, the notary support system 106 generates a digital record comprising digital data corresponding to notarization of the digital document during the video chat. In some cases, the acts include providing, to the client device, a link for accessing the notarized digital document. For example, in some cases, the notary support system 106 provides, to the client device, an email comprising a link for accessing the notarized digital document.

In some instances, the series of acts 1200 further includes acts for monitoring and/or recording the user of the client device during the video chat. For example, in some implementations, the acts include capturing, during the video chat and using a camera associated with the client device, a digital image of the user of the client device. In some instances, the acts include monitoring an emotional state of the user of the client device; determining, that the user of the client device is associated with a state of duress; and providing, to the notary support terminal, a notification of the state of duress associated with the user of the client device.

To provide an exemplary illustration of implementing the series of acts 1200, in one or more embodiments, the notary support system 106 conducts a video chat for notarizing a digital document between a client device and a notary support terminal; provides, on a display of the client device, the video chat between the client device and the notary support terminal within a first pane and at least one notarization interface for notarizing the digital document in a second pane; and notarizes the digital document during the video chat by: determining a proof of an identification card associated with a user of the client device, the identification card depicted in one or more digital images captured using the at least one notarization interface; executing knowledge-based authentication for the user based on user input received through the at least one notarization interface; generating one or more digital signatures for the digital document based on one or more user interactions with the at least one notarization interface; and applying, to the digital document, an electronic notary seal received from the notary support terminal.

In some implementations, the notary support system 106 further notarizes the digital document during the video chat by generating one or more digital notary signatures for the digital document based on additional user input received from the notary support terminal. In some cases, the notary support system 106 further notarizes the digital document during the video chat by providing a plurality of knowledge-based authentication security questions to the client device via the at least one notarization interface. Accordingly, executing the knowledge-based authentication for the user based on the user input received through the at least one notarization interface comprises executing the knowledge-based authentication based on answers to the plurality of knowledge-based authentication security questions received via the at least one notarization interface.

To provide another exemplary illustration of implementing the series of acts 1200, in one or more embodiments, the notary support system 106 generates a plurality of digital fields for a digital document to be notarized; conducts a video chat between a client device and a notary support terminal; transmits, to the client device, a notarization trigger to cause division of a display of the client device into a first pane displaying the video chat and a second pane displaying at least one notarization interface associated with a notary workflow; and notarizes the digital document during the video chat by: receiving an indication of authenticity of a user of the client device determined based on user input received through the at least one notarization interface; generating at least one digital signature for one or more digital fields of the plurality of digital fields; and applying at least one electronic notary seal to one or more additional digital fields of the plurality of digital fields.

In some instances, generating the plurality of digital fields for the digital document to be notarized comprises: determining at least one location of the digital document for a digital signature based on one or more user inputs received from the notary support terminal; and generating at least one digital signature field corresponding to the at least one location of the digital document. In some cases, generating the plurality of digital fields for the digital document to be notarized comprises: determining at least one additional location of the digital document for an electronic notary seal based on one or more additional user inputs received from the notary support terminal; and generating at least one electronic notary seal field corresponding to the at least one additional location of the digital document.

In one or more embodiments, the notary support system 106 further notarizes the digital document during the video chat by providing, for display on the client device, an identification card photo interface for capturing one or more digital images of an identification card associated with the user of the client device. Accordingly, receiving the indication of authenticity of the user of the client device determined based on the user input received through the at least one notarization interface comprises receiving an indication of identification validation based on the one or more digital images of the identification card captured via the identification card photo interface.

In some cases, the notary support system 106 further notarizes the digital document during the video chat by providing, for display on the client device, at least one knowledge-based authentication interface comprising one or more knowledge-based authentication security questions. Accordingly, receiving the indication of authenticity of the user of the client device determined based on the user input received through the at least one notarization interface comprises receiving an indication of satisfaction of the one or more knowledge-based authentication security questions based on one or more answers received via the at least one knowledge-based authentication interface.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1300 illustrates, in block diagram form, an exemplary computing device 1300 that may be configured to perform one or more of the processes described above. One will appreciate that the environment 100 can comprise implementations of the computing device 1300. As shown by FIG. 13, the computing device 1300 can comprise a processor 1302, memory 1304, a storage device 1306, an I/O interface 1308, and a communication interface 1310. While an exemplary computing device 1300 is shown in FIG. 13, the components illustrated in FIG. 13 are not intended to be limiting. Additional or alternative components may be used in other embodiments. Furthermore, in certain embodiments, a computing device 1300 can include fewer components than those shown in FIG. 13. Components of computing device 1300 shown in FIG. 13 will now be described in additional detail.

In particular embodiments, processor(s) 1302 includes hardware for executing instructions, such as those making up a computer program. As an example and not by way of limitation, to execute instructions, processor(s) 1302 may retrieve (or fetch) the instructions from an internal register, an internal cache, memory 1304, or a storage device 1306 and decode and execute them. In particular embodiments, processor(s) 1302 may include one or more internal caches for data, instructions, or addresses. As an example and not by way of limitation, processor(s) 1302 may include one or more instruction caches, one or more data caches, and one or more translation lookaside buffers (TLBs). Instructions in the instruction caches may be copies of instructions in memory 1304 or storage 1306.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, storage device 1306 can comprise a non-transitory storage medium described above. The storage device 1306 may include a hard disk drive (HDD), a floppy disk drive, flash memory, an optical disc, a magneto-optical disc, magnetic tape, or a Universal Serial Bus (USB) drive or a combination of two or more of these. Storage device 1306 may include removable or non-removable (or fixed) media, where appropriate. Storage device 1306 may be internal or external to the computing device 1300. In particular embodiments, storage device 1306 is non-volatile, solid-state memory. In particular embodiments, storage device 1306 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a stylus or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 1310. As an example, and not by way of limitation, computing device 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing device 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 1300 may include any suitable communication interface 1310 for any of these networks, where appropriate.

The computing device 1300 can further include a bus 1312. The bus 1312 can comprise hardware, software, or both that couples components of computing device 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
    conducting a video chat for notarizing a digital document between a client device and a notary support terminal;
    providing, on a display of the client device, the video chat between the client device and the notary support terminal within a first pane and at least one notarization interface for notarizing the digital document in a second pane; and
    notarizing the digital document during the video chat by:
        overlaying at least the first pane or the second pane with a viewfinder display for capturing at least one digital image providing identification for a user of the client device based on user input received through the at least one notarization interface;
        authenticating the user of the client device using the at least one digital image captured via the viewfinder display;
        generating one or more digital signatures for the digital document based on one or more user interactions with the at least one notarization interface; and
        applying, to the digital document, an electronic notary seal received from the notary support terminal.

2. The method of claim 1,
    further comprising generating one or more digital signature fields for the digital document based on additional user input received from the notary support terminal,
    wherein generating the one or more digital signatures comprises generating the one or more digital signatures within the one or more digital signature fields.

3. The method of claim 1,
    further comprising generating one or more electronic notary seal fields for the digital document based on additional user input received from the notary support terminal,
    wherein applying the electronic notary seal to the digital document comprises applying the electronic notary seal within the one or more electronic notary seal fields.

4. The method of claim 1, further comprising:
    providing, to the client device, one or more knowledge-based authentication security questions via the at least one notarization interface;
    receiving one or more answers to the one or more knowledge-based authentication security questions via the at least one notarization interface; and
    determining an authenticity of the user of the client device based on the one or more answers.

5. The method of claim 1, further comprising:
    generating a digital record based on notarization of the digital document during the video chat; and
    storing the digital record in association with a notary associated with the notary support terminal.

6. The method of claim 1, further comprising providing, to the client device, a link for accessing the notarized digital document.

7. The method of claim 1, further comprising capturing, during the video chat and using a camera associated with the client device, a digital image of the user of the client device.

8. The method of claim 1, further comprising receiving the digital document to be notarized from the notary support terminal.

9. The method of claim 1, further comprising, during the video chat:
    monitoring an emotional state of the user of the client device;
    determining, that the user of the client device is associated with a state of duress; and providing, to the notary support terminal, a notification of the state of duress associated with the user of the client device.

10. A non-transitory computer-readable medium storing instructions thereon that, when executed by at least one processor, cause a computing device to:
conduct a video chat for notarizing a digital document between a client device and a notary support terminal;
provide, on a display of the client device, the video chat between the client device and the notary support terminal within a first pane and at least one notarization interface for notarizing the digital document in a second pane; and
notarize the digital document during the video chat by:
overlaying at least the first pane or the second pane with a viewfinder display for capturing at least one digital image of an identification card associated with a user of the client device based on user input received through the at least one notarization interface;
determining a proof of the identification card associated with the user of the client device using the at least one digital image;
executing knowledge-based authentication for the user based on user input received through the at least one notarization interface;
generating one or more digital signatures for the digital document based on one or more user interactions with the at least one notarization interface; and
applying, to the digital document, an electronic notary seal received from the notary support terminal.

11. The non-transitory computer-readable medium of claim 10, further comprising instructions that, when executed by the at least one processor, cause the computing device to notarize the digital document during the video chat by generating one or more digital notary signatures for the digital document based on additional user input received from the notary support terminal.

12. The non-transitory computer-readable medium of claim 10, further comprising instructions that, when executed by the at least one processor, cause the computing device to notarize the digital document during the video chat by providing a plurality of knowledge-based authentication security questions to the client device via the at least one notarization interface,
wherein executing the knowledge-based authentication for the user based on the user input received through the at least one notarization interface comprises executing the knowledge-based authentication based on answers to the plurality of knowledge-based authentication security questions received via the at least one notarization interface.

13. The non-transitory computer-readable medium of claim 10, further comprising instructions that, when executed by the at least one processor, cause the computing device to:
generate a digital record comprising digital data corresponding to notarization of the digital document during the video chat; and
storing the digital record in association with a notary associated with the notary support terminal.

14. A method comprising:
generating a plurality of digital fields for a digital document to be notarized;
conducting a video chat between a client device and a notary support terminal;
transmitting, to the client device, a notarization trigger to cause division of a display of the client device into a first pane displaying the video chat and a second pane displaying at least one notarization interface associated with a notary workflow; and
notarizing the digital document during the video chat by:
receiving at least one digital image providing identification for a user of the client device, the at least one digital image captured via a viewfinder display that replaced at least the first pane or the second pane of the client device;
receiving an indication of authenticity of the user of the client device determined using the at least one digital image;
generating at least one digital signature for one or more digital fields of the plurality of digital fields; and
applying at least one electronic notary seal to one or more additional digital fields of the plurality of digital fields.

15. The method of claim 14, wherein generating the plurality of digital fields for the digital document to be notarized comprises:
determining at least one location of the digital document for a digital signature based on one or more user inputs received from the notary support terminal; and
generating at least one digital signature field corresponding to the at least one location of the digital document.

16. The method of claim 15, wherein generating the plurality of digital fields for the digital document to be notarized comprises:
determining at least one additional location of the digital document for an electronic notary seal based on one or more additional user inputs received from the notary support terminal; and
generating at least one electronic notary seal field corresponding to the at least one additional location of the digital document.

17. The method of claim 14, wherein receiving the indication of authenticity of the user of the client device determined using the at least one digital image comprises:
providing the at least one digital image to a third-party identification proofing system; and
receiving the indication of authenticity from the third-party identification proofing system in response.

18. The method of claim 14, further comprising:
notarizing the digital document during the video chat by providing, for display on the client device, at least one knowledge-based authentication interface comprising one or more knowledge-based authentication security questions; and
receiving an indication of satisfaction of the one or more knowledge-based authentication security questions based on one or more answers received via the at least one knowledge-based authentication interface.

19. The method of claim 14, further comprising providing, to the client device, an email comprising a link for accessing the notarized digital document.

20. The method of claim 1, wherein overlaying at least the first pane or the second pane with the viewfinder display comprises overlaying the at least one notarization interface displayed in the second pane with the viewfinder display while maintaining the video chat in the first pane.

* * * * *